(12) United States Patent
Lin et al.

(10) Patent No.: US 10,291,707 B1
(45) Date of Patent: May 14, 2019

(54) SYSTEMS AND METHODS FOR BALANCING STORAGE RESOURCES IN A DISTRIBUTED DATABASE

(71) Applicant: TWITTER, INC., San Francisco, CA (US)

(72) Inventors: Yi Lin, Seattle, WA (US); Sumeet Lahorani, San Francisco, CA (US); Deng Liu, Millbrae, CA (US); Peter Schuller, San Francisco, CA (US); Tugrul Bingol, San Carlos, CA (US); Neng Lu, San Francisco, CA (US); Chongfeng Hu, Redmond, WA (US); Ying Xu, Fremont, CA (US)

(73) Assignee: Twitter, Inc., San Francisco, CA (US)

( * ) Notice: Subject to any disclaimer, the term of this patent is extended or adjusted under 35 U.S.C. 154(b) by 198 days.

(21) Appl. No.: 15/158,326

(22) Filed: May 18, 2016

Related U.S. Application Data

(60) Provisional application No. 62/261,827, filed on Dec. 1, 2015, provisional application No. 62/163,365, filed on May 18, 2015.

(51) Int. Cl.
 *G06F 17/30* (2006.01)
 *H04L 29/08* (2006.01)
(52) U.S. Cl.
 CPC .... *H04L 67/1097* (2013.01); *G06F 17/30575* (2013.01)
(58) Field of Classification Search
 None
 See application file for complete search history.

(56) References Cited

U.S. PATENT DOCUMENTS

| | | | | |
|---|---|---|---|---|
| 2012/0290714 A1* | 11/2012 | Cohen | ............ | G06F 11/00 709/224 |
| 2013/0268914 A1* | 10/2013 | Oslake | ............ | G06F 9/5072 717/120 |
| 2014/0229696 A1* | 8/2014 | Feng | ............ | G06F 3/064 711/162 |

OTHER PUBLICATIONS

What makes a container cluster, Jan. 22, 2015, pp. 1-16. (Year: 2015).*
Cidon et al., "Copysets: Reducing the Frequency of Data Loss in Cloud Storage", 2013 USENIX Annual Technical Conference, 37-48 (2013).
Usenix.org, "Copysets: Reducing the Frequency of Data Loss in Cloud Storage," (2013). Retrieved from the Internet on Jul. 19, 2016: URL: https://www.usenix.org/conference/atc13/technical-sessions/presentation/cidon.

(Continued)

*Primary Examiner* — Alex Gofman
(74) *Attorney, Agent, or Firm* — Wolf, Greenfield & Sacks, P.C.

(57) ABSTRACT

Embodiments are provided for balancing storage resources in a distributed database. According to certain aspects, various hardware components may facilitate a three-stage technique including a node balancer technique, a shard balancer technique, and a replica balancer technique. The node balancer technique may create a set of pods from a set of nodes residing across a set of storage racks. The shard balancer technique may redistribute, among the set of pods, a portion of a set of shards assigned to respective pods of the set of pods. The replica balancer technique may, for each pod, distribute the set of replicas so that the replicas reside across the storage racks of that pod.

22 Claims, 15 Drawing Sheets

(56) References Cited

OTHER PUBLICATIONS

MongoDB, "Replica Set Members". Retrieved from the Internet at: <https://docs.mongodb.com/manual/core/replica-set-members/> on Aug. 25, 2016.

Twitter Blogs, "Libcrunch and CRUSH Maps". Retrieved from the Internet at: <http://blog.twitter.com/2013/libcrunch-and-crush-maps> on Aug. 26, 2016.

* cited by examiner

300

STEP 1: ⎯340

| RACK ID: NODE IDs | POD 1: |
|---|---|
| RACK 1: [1], [2], 3, 4, 5, 6, 7 | RACK 1: 1, 2 |
| RACK 2: [1], [2], 3, 4, 5, 6 | RACK 2: 1, 2 |
| RACK 3: [1], [2], 3, 4, 5 | RACK 3: 1, 2 |
| RACK 4: [1], 2, 3, 4, 5 | RACK 4: 1 |
| RACK 5: [1], 2, 3 | RACK 5: 1 |

STEP 2: ⎯342

| RACK ID: NODE IDs | POD 2: |
|---|---|
| RACK 1: [3], [4], 5, 6, 7 | RACK 1: 3, 4 |
| RACK 2: [3], [4], 5, 6 | RACK 2: 3, 4 |
| RACK 4: [2], [3], 4, 5 | RACK 4: 2, 3 |
| RACK 3: [3], 4, 5 | RACK 3: 3 |
| RACK 5: [2], 3 | RACK 5: 2 |

STEP 3: ⎯344

| RACK ID: NODE IDs | POD 3: |
|---|---|
| RACK 1: [5], [6], 7 | RACK 1: 5, 6 |
| RACK 2: [5], [6] | RACK 2: 5, 6 |
| RACK 4: [4], [5] | RACK 4: 4, 5 |
| RACK 3: [4], 5 | RACK 3: 4 |
| RACK 5: [3] | RACK 5: 3 |

SYSTEMS AND METHODS FOR BALANCING STORAGE RESOURCES IN A DISTRIBUTED DATABASE

CROSS-REFERENCE TO RELATED APPLICATIONS

This application claims the benefit of U.S. Provisional Application No. 62/163,365, filed May 18, 2015, and the benefit of U.S. Provisional Application No. 62/261,827, filed Dec. 1, 2015, the disclosures of which are incorporated by reference herein in their entireties.

FIELD

The present disclosure generally relates to distributed databases and, more particularly, to systems and methods of balancing storage resources in a distributed database.

BACKGROUND

Distributed database systems include a plurality of storage devices spread among a network of interconnected computers. The distributed database systems typically have greater reliability and availability than parallel database systems, among other benefits. Various internet services, for example social networking services, employ distributed database systems to manage the storage and retrieval of information. Distributed databases may employ replication which involves the electronic copying of data to multiple resources of the database so that users of the database may access data relevant to their tasks without interfering with the work of others. Additionally, changes applied to data stored on one resource are captured and propagated across the other resources that store copies of that data, thus enabling users with fast, local access to shared data, while protecting the availability of applications.

In a distributed database that stores shards of data objects on nodes, it is desirable to achieve good load balance and enable fast data recovery if a node dies or if a new node needs to be added. Accordingly, there is an opportunity for efficient and effective distributed database replication techniques and frameworks.

SUMMARY

In an embodiment, a computer-implemented method of balancing data objects stored on a plurality of storage resources is provided. The method may include creating, by a computer processor, a set of pods from a set of nodes residing across a set of storage racks, including, for creating each pod of the set of pods, assigning, to the pod, at least a portion of the set of nodes residing in each of the set of storage racks until the pod is assigned a specified amount of nodes, wherein the pod has assigned a set of shards each comprising a set of replicas of a data object. After creating the set of pods, the method may include distributing at least a portion of the respective set of shards assigned to a first set of the set of pods among a second set of the set of pods according to an available capacity of each of the first set and the second set of the set of pods. Further, after distributing at least the portion of the respective set of shards, the method may include distributing, for each of the set of shards within each pod of the set of pods, the set of replicas of the data object to ensure that each replica of the set of replicas is assigned to a node of the set of nodes from a different storage rack of the set of storage racks for that pod.

In another embodiment, a system for balancing data objects stored on a plurality of storage resources is provided. The system may include a computer processor, a set of storage racks, and a set of nodes residing across the set of storage racks. The system may further include a pod creation module executed by the computer processor and configured to create a set of pods from the set of nodes residing across the set of storage racks. To create each pod of the set of pods, the pod creation module may be configured to assign, to the pod, at least a portion of the set of nodes residing in each of the set of storage racks until the pod is assigned a specified amount of nodes, wherein the pod has assigned a set of shards each comprising a set of replicas of a data object. The system may further include a balancer module executed by the computer processor and configured to distribute at least a portion of the respective set of shards assigned to a first set of the set of pods among a second set of the set of pods according to an available capacity of each of the first set and the second set of the set of pods, and after distributing the at least the portion of the respective set of shards, distribute, for each of the set of shards within each pod of the set of pods, the set of replicas of the data object to ensure that each replica of the set of replicas is assigned to a node of the set of nodes from a different storage rack of the set of storage racks for that pod.

In an embodiment, a computer-implemented method of balancing, within a pod, replicas of a set of shards is provided. According to embodiments, the pod may have assigned a set of nodes residing across a set of storage racks, where the set of shards may be assigned to the set of nodes. The method may include determining, by a computer processor, that the replicas of the set of shards are not balanced among the set of nodes; responsive to the determining, identifying a candidate replica of a given shard of the set of shards; identifying a subset of the set of storage racks that do not contain a replica of the given shard; and determining, from the subset of the set of storage racks, at least one node having the greatest amount of free space. The method may further include selecting, from the at least one node having the greatest amount of free space, a subset of nodes that would result in the lowest node shard overlap factor (SOF) within the pod; selecting, from the subset of nodes, an additional subset of nodes that would result in the lowest rack SOF within the pod; designating, in a deterministic order from the additional subset of nodes, a destination node; and reassigning the candidate replica to the destination node.

In an embodiment, identifying the candidate replica of the given shard may include identifying, as the candidate replica, a new replica within the pod.

In an embodiment, when there is not a new replica within the pod, identifying the candidate replica of the given shard may include identifying the candidate replica of the given shard that is assigned to a failed node of the set of nodes.

In an embodiment, when there is not a failed node of the set of nodes, identifying the candidate replica of the given shard may include identifying the candidate replica of the given shard that is assigned to a node of the set of nodes having the least amount of free space.

In an embodiment, identifying the candidate replica of the given shard may include identifying the candidate replica of the given shard that is assigned to the node of the set of nodes (i) having the least amount of free space, and (ii) having the highest shard overlap factor (SOF).

In an embodiment, identifying the candidate replica of the given shard further may include identifying the candidate replica of the given shard that is assigned to the node of the set of nodes whose storage rack has the highest shard overlap factor (SOF).

In an embodiment, selecting the subset of nodes that would result in the lowest node shard overlap factor (SOF) within the pod may include identifying, from the at least one node having the greatest amount of free space, a node currently having the lowest node SOF within the pod.

In an embodiment, the method may further include repeating the identifying the candidate replica, the identifying the subset of the set of storage racks, the determining the at least one node, the selecting the subset of the nodes, the selecting the additional subset of nodes, the designating the destination node, and the reassigning, until each replica of each of the set of shards is assigned to a node of a different storage rack.

In an embodiment, the method may further include repeating, for additional replicas of an additional set of shards within at least one additional pod, the identifying the candidate replica, the identifying the subset of the set of storage racks, the determining the at least one node, the selecting the subset of the nodes, the selecting the additional subset of nodes, the designating the destination node, and the reassigning.

In an embodiment, the method may further include distributing at least a portion of the set of shards to the pod from an additional pod according to an available capacity of each of the pod and the additional pod.

In another embodiment, a system for balancing, within a pod, replicas of a set of shards is provided. The system may include a computer processor, a set of storage racks, a set of nodes (i) residing across the set of storage racks, (ii) assigned to the pod, and (iii) having the set of shards assigned thereto, and a balancer module executed by the computer processor. The balancer module may be configured to determine that the replicas of the set of shards are not balanced among the set of nodes, responsive to the determination, identify a candidate replica of a given shard of the set of shards, identify a subset of the set of storage racks that do not contain a replica of the given shard, determine, from the subset of the set of storage racks, at least one node having the greatest amount of free space. The balancer module may be further configured to select, from the at least one node having the greatest amount of free space, a subset of nodes that would result in the lowest node shard overlap factor (SOF) within the pod, select, from the subset of nodes, an additional subset of nodes that would result in the lowest rack SOF within the pod, designate, in a deterministic order from the additional subset of nodes, a destination node, and reassign the candidate replica to the destination node.

In an embodiment, to identify the candidate replica of the given shard, the balancer module may be configured to identify, as the candidate replica, a new replica within the pod.

In an embodiment, wherein when there is not a new replica within the pod, the balancer module may be configured to identify the candidate replica of the given shard that is assigned to a failed node of the set of nodes.

In an embodiment, wherein when there is not a failed node of the set of nodes, the balancer module may be configured to identify the candidate replica of the given shard that is assigned to a node of the set of nodes having the least amount of free space.

In an embodiment, wherein to identify the candidate replica of the given shard, the balancer module may be configured to identify the candidate replica of the given shard that is assigned to the node of the set of nodes (i) having the least amount of free space, and (ii) having the highest shard overlap factor (SOF).

In an embodiment, the balancer module may further identify the candidate replica of the given shard that is assigned to the node of the set of nodes whose storage rack has the highest shard overlap factor (SOF).

In an embodiment, wherein to select the subset of nodes that would result in the lowest node shard overlap factor (SOF) within the pod, the balancer module may be further configured to identify, from the at least one node having the greatest amount of free space, a node currently having the lowest node SOF within the pod.

In an embodiment, the balancer module may be further configured to repeat the identifying the candidate replica, the identifying the subset of the set of storage racks, the determining the at least one node, the selecting the subset of the nodes, the selecting the additional subset of nodes, the designating the destination node, and the reassigning, until each replica of each of the set of shards is assigned to a node of a different storage rack.

In an embodiment, the balancer module may be further configured to repeat, for additional replicas of an additional set of shards within at least one additional pod, the identifying the candidate replica, the identifying the subset of the set of storage racks, the determining the at least one node, the selecting the subset of the nodes, the selecting the additional subset of nodes, the designating the destination node, and the reassigning.

In an embodiment, the balancer module may be further configured to distribute at least a portion of the set of shards to the pod from an additional pod according to an available capacity of each of the pod and the additional pod.

In an embodiment, a computer-implemented method of balancing a set of shards assigned across a set of pods is provided. According to embodiments, each shard of the set of shards may include a set of replicas of a set of data objects. The method may include, for each pod of the set of pods, determining (i) a total weight of the corresponding set of shards assigned to the pod, and (ii) a capacity of the pod; calculating, by a computer processor, a global average load across the set of pods based on a sum of the total weights of the corresponding sets of shards and a sum of the capacities of the set of pods; and determining, based on the global average load, the respective total weight of the corresponding set of shards, and the respective capacity of the pod, (i) a set of overloaded pods of the set of pods and (ii) a set of underloaded pods of the set of pods. The method may further include creating a shard pool including, for each pod in the set of overloaded pods: removing a portion of the set of shards from the pod until removing an additional shard of the set of shards would result in the pod being underloaded, and adding the portion of the set of shards to the shard pool; generating an ordered list of shards from the shard pool according to a respective weight of each shard of the shard pool; and until the shard pool is empty: identifying the most underloaded pod from the set of underloaded pods, and assigning, to the most underloaded pod, a shard from the shard pool having the highest weight according to the ordered list of shards.

In an embodiment, calculating the global average load across the set of pods may include calculating the global average load across the set of pods by dividing the sum of the total weights of the corresponding sets of shards by the sum of the capacities of the set of pods.

In an embodiment, determining (i) the set of overloaded pods of the set of pods and (ii) the set of underloaded pods of the set of pods may include, for each pod of the set of pods, calculating a headroom amount based on the global average load, the respective total weight of the corresponding set of shards, and the respective capacity of the pod; and based on the respective headroom amounts of the set of pods, identifying (i) the set of overloaded pods as any pods having negative headroom and (ii) the set of underloaded pods as any pods having positive headroom.

In an embodiment, calculating the headroom amount may include for each pod of the set of pods, calculating the headroom amount as a difference between (i) a product of the global average load and the respective capacity of the pod, and (ii) the respective total weight of the corresponding set of shards.

In an embodiment, the method may further include adding the set of underloaded pods to a heap data structure sorted by the respective headroom amount of the set of underloaded pods.

In an embodiment, identifying the most underloaded pod from the set of underloaded pods may include removing the most underloaded pod from a heap data structure.

In an embodiment, the method may further include after assigning the shard to the most underloaded pod, determining that the most underloaded pod with the shard assigned thereto is still underloaded; and inserting the most underloaded pod with the shard assigned thereto back into the heap data structure.

In an embodiment, removing the portion of the set of shards from the pod may include removing the portion of the set of shards from the pod in order from lightest weight to heaviest weight until removing the additional shard of the set of shards would result in the pod being underloaded.

In an embodiment, generating the ordered list of shards may include determining that at least two shards from the shard pool have the same weight; and ordering the at least two shards according to respective identifications of the at least two shards.

In an embodiment, the method may further include creating the set of pods from a set of nodes residing across a set of storage racks, including, for creating each pod of the set of pods, assigning, to the pod, at least a portion of the set of nodes residing in each of the set of storage racks until the pod is assigned a specified amount of nodes.

In another embodiment, a system for balancing data across storage resources is provided. The system may include a computer processor, a set of pods, and a set of shards assigned across the set of pods, wherein each shard of the set of shards comprises a set of replicas of a set of data objects. The system may further include a pod analysis module executed by the computer processor and configured to: for each pod of the set of pods, determine (i) a total weight of the corresponding set of shards assigned to the pod, and (ii) a capacity of the pod, calculate a global average load across the set of pods based on a sum of the total weights of the corresponding sets of shards and a sum of the capacities of the set of pods, and determine, based on the global average load, the respective total weight of the corresponding set of shards, and the respective capacity of the pod, (i) a set of overloaded pods of the set of pods and (ii) a set of underloaded pods of the set of pods. The system may further include a shard pool creation module executed by the computer processor and configured to create a shard pool including, for each pod in the set of overloaded pods: remove a portion of the set of shards from the pod until removing an additional shard of the set of shards would result in the pod being underloaded, and add the portion of the set of shards to the shard pool. Further, the system may include a balancer module executed by the computer processor and configured to: generate an ordered list of shards from the shard pool according to a respective weight of each shard of the shard pool, and until the shard pool is empty: identify the most underloaded pod from the set of underloaded pods, and assign, to the most underloaded pod, a shard from the shard pool having the highest weight according to the ordered list of shards.

In an embodiment, to calculate the global average load across the set of pods, the pod analysis module may be configured to calculate the global average load across the set of pods by dividing the sum of the total weights of the corresponding sets of shards by the sum of the capacities of the set of pods.

In an embodiment, to determine (i) the set of overloaded pods of the set of pods and (ii) the set of underloaded pods of the set of pods, the pod analysis module may be configured to for each pod of the set of pods, calculate a headroom amount based on the global average load, the respective total weight of the corresponding set of shards, and the respective capacity of the pod, and based on the respective headroom amounts of the set of pods, identify (i) the set of overloaded pods as any pods having negative headroom and (ii) the set of underloaded pods as any pods having positive headroom.

In an embodiment, to calculate the headroom amount, the pod analysis module may be configured to for each pod of the set of pods, calculate the headroom amount as a difference between (i) a product of the global average load and the respective capacity of the pod, and (ii) the respective total weight of the corresponding set of shards.

In an embodiment, the pod analysis module may be further configured to add the set of underloaded pods to a heap data structure sorted by the respective headroom amount of the set of underloaded pods.

In an embodiment, to identify the most underloaded pod from the set of underloaded pods, the balancer module may be configured to remove the most underloaded pod from a heap data structure.

In an embodiment, the balancer module may be further configured to, after assigning the shard to the most underloaded pod, determine that the most underloaded pod with the shard assigned thereto is still underloaded, and insert the most underloaded pod with the shard assigned thereto back into the heap data structure.

In an embodiment, wherein to remove the portion of the set of shards from the pod, the shard pool creation module may be configured to remove the portion of the set of shards from the pod in order from lightest weight to heaviest weight until removing the additional shard of the set of shards would result in the pod being underloaded.

In an embodiment, wherein to generate the ordered list of shards, the balancer module may be configured to determine that at least two shards from the shard pool have the same weight, and order the at least two shards according to respective identifications of the at least two shards.

In an embodiment, the system may further include a pod creation module executed by the computer processor and configured to create the set of pods from a set of nodes residing across a set of storage racks, wherein to create each pod of the set of pods, the pod creation module is configured to: assign, to the pod, at least a portion of the set of nodes residing in each of the set of storage racks until the pod is assigned a specified amount of nodes.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
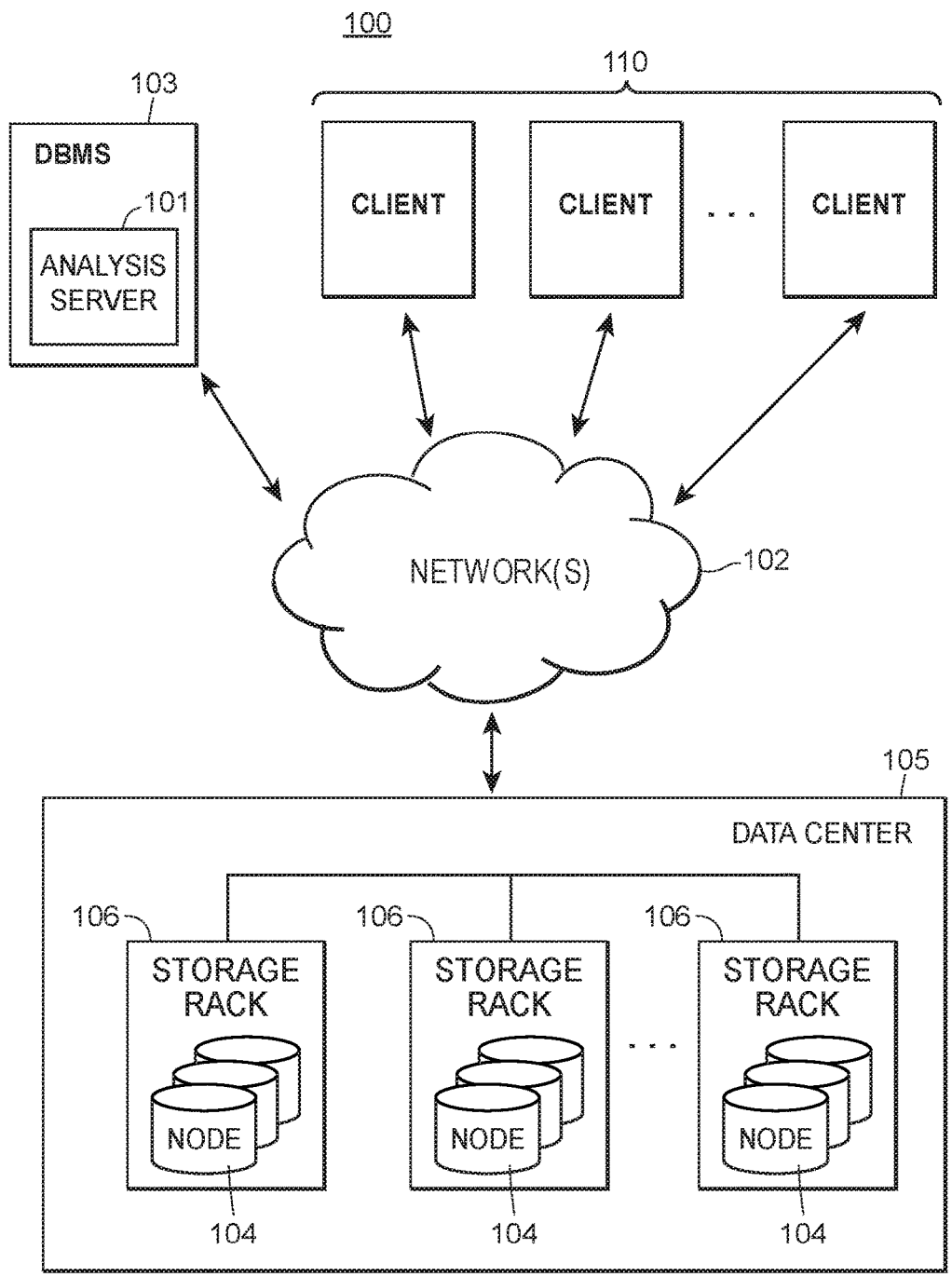
FIG. 1 depicts a system capable of implementing a distributed database, in accordance with some embodiments.

According to the present embodiments, systems and methods for balancing storage resources within a distributed database are disclosed. Generally, database replication involves copying and maintaining database objects across multiple storage resources that make up a distributed database system. A database management system (DBMS) may capture changes applied at one resource, and forward the changes to other resources for application thereon, thus enabling fast, local access to shared data and protecting the availability of applications, among other benefits. The systems and methods of the present embodiments initialize and manage the storage resources of the distributed database so that the distributed database experiences efficient load balance, a faster data recovery in the event of a resource fail, and a lower risk of permanently losing data, among other benefits.

The storage resources may be included in a data center, which may be physically composed of a set of storage racks that are logically grouped into a set of storage clusters. A storage rack is a physical unit in a data center in which multiple trays or blades share resources, where the trays or blades are at least capable of storing data and in some implementations capable of various data processing functionalities. The shared resources may include power resources, network resources, and thermomanagement resources. Each storage rack may include at least some form of memory and also may include a processor.

A storage cluster is a logical grouping of physical components included in one or more storage racks. Typically, the physical components of a storage cluster are logically grouped for management and efficiency purposes, such as to accommodate a service and the requirements of the service. The physical components collectively work together to increase performance, capacity, and/or reliability within the storage cluster. The storage cluster enables the distribution of work loads to the physical components, manages the transfer of workloads between and among the physical components, and provides access to files of the physical components regardless of the physical location of the file. A management component may automatically and dynamically modify a storage cluster, such as by adding physical components to or removing physical components from the storage cluster, such as in response to a modified capacity requirement.

A set of nodes may reside across each of the storage racks (i.e., the set of nodes are physically assigned or associated with the storage rack), wherein a storage cluster may be a logical grouping of a set of nodes residing across one or more partial or whole storage racks. A node is a unit of storage as treated or considered by an operating system or kernel, where the operating system or kernel may run or control the machines or components that provide or manage the storage functions as discussed herein. A node, for example, may be a single disk on a tray or blade operating under a Linux® operating system (OS), a suitable one being CentOS.

A shard is a logical data partition created according to any type of suitable sharding scheme, for example, indexing, hashing, or the like. Shards are typically, but not necessarily of different sizes. Different shards may contain a same data object as well as different data objects. Each shard may have one or more replicas of itself. Collectively, the replicas of a set of shards may be assigned to nodes spread across multiple storage racks and storage clusters. Thus, "database sharding" generally improves search performance and improves performance by spreading the data load across a plurality of storage components, among other benefits.

A replica is an instantiation of a shard. Typically, a particular shard will have multiple replicas to protect against data loss. If a node hosting one of a given shard's replicas fails, for example, others of the given shard's replicas (stored at other nodes still operational) can be used as alternatives. Moreover, implementation of replicas provide the ability to scale by balancing requests to data in a shard among its replicas. While the replicas of a particular shard may be identical, different shards may have different number of replicas.

A data object is the atomic unit of data designated for storage in the distributed database, where the atomic unit may be dictated by the type of data being stored. For example, if a data cluster includes images and videos, a single video may be considered a data object (or, if the video is segmented into multiple layers, each layer may be considered a data object) and a single image may be considered a data object. A data object may have a maximum threshold amount.

Initially, the systems and methods may create a set of "pods" from the nodes residing across the set of storage racks, where a node (and its shard(s) and replicas) is assigned to a single pod. A pod may thus be a logical grouping of a set of nodes (and by extension, a set of shards and a set of replicas), where all of the replicas of a shard are assigned to the same pod, and where each of the shards is running on a physical machine. Thus, a pod may have resources (nodes) and demand (shards). Further, each pod includes a logical grouping of shards that are physically running on physical machines, where a pod cannot use a physical machine that is already "taken" by another pod.

The systems and methods may facilitate balancing the storage resources in three levels or stages: (1) a "node balancer" technique in which the DBMS may create a set of pods from the set of nodes residing across the set of storage racks, (2) a "shard balancer" technique in which the DBMS may balance the set of shards among the set of created pods, and (3) a "replica balancer" technique in which the DBMS may, for each pod, balance the set of replicas among the set of nodes. The goal of the node balancer technique is to create the set of pods such that each pod has a similar capacity while maximizing a target rack diversity and the number of nodes sharing data with a node (i.e., the replica distribution factor or "RDF"). The RDF of a node refers to the number of nodes (including the node itself) that shares data with the node, where two nodes share data if they both have replicas of the same shard. The goal of the shard balancer technique is to balance the set of shards so that each pod has a similar shard weight relative to the capacity of the pod. The goal of the replica balancer technique is maximize the RDF and balance relative weights of nodes and storage racks.

The systems and methods offer numerous improvements, which particularly benefit any services that may access the distributed database. In particular, the systems and methods may effectively balance a larger number of nodes that reside across a larger amount of storage racks. Further, the systems and methods achieve load balance across the storage resources while limiting the number of data movements and the need for additional resources to accommodate the data movements. Additionally, the systems and methods enable effective and efficient repair of nodes in the event of node failure. It should be appreciated that additional improvements and benefits of the systems and methods are envisioned.

The systems and methods discussed herein address a challenge that is particular to distributed databases. In particular, the challenge relates to a difficulty in balancing storage resources within a distributed database. This is particularly apparent with the increasing amount of storage resources needed to handle certain services such as online services with large amounts of users. Conventional frameworks attempt to balance storage resources at the expense of a large amount of data movements, the need for additional resources to accommodate the data movements, and an inefficient load balance. In contrast, the systems and methods employ a three-stage technique that effectively balances large amounts of storage resources while mitigating the performance drawbacks of existing frameworks. Therefore, because the systems and methods employ the analysis and management of physical storage resources of a distributed database, the systems and methods are necessarily rooted in computer technology in order to overcome the noted shortcomings that specifically arise in the realm of distributed databases.

Similarly, the systems and methods provide improvements in a technical field, namely, database management. Instead of the systems and methods merely being performed by hardware components using basic functions, the systems and methods employ complex steps that go beyond the mere concept of simply retrieving and combining data using a computer. In particular, the hardware components create a set of pods from a set of nodes residing across a set of storage racks, distribute shards among pods, and distribute replicas among nodes within the pods, among other functionalities. This combination of elements further impose meaningful limits in that the operations are applied to improve database management in a meaningful and effective way.

FIG. 1 illustrates a general system architecture of a system 100 including a data center 105. The data center 105 may be in the form of a distributed database that may include storage devices or computer resources that are distributed across a plurality of physical computers, such as a network of interconnected computers. The storage devices may be virtually or physically separated, and may be configured to interface with one or more processing units such as one or more CPUs. Further, each of the storage devices may be of one or more various types (e.g., solid state drives (SSDs), platter storage such as hard disk drives, or other memory) and structures (e.g., SSTable, seadb, b-tree, or others).

As illustrated in FIG. 1, the storage resources may be physically and logically composed of one or more storage racks 106 that may each include a set of individual hardware machines. Each of the storage racks 106 may include hardware components at least capable of storing data, and in some implementations capable of various data processing functionalities. Further, multiple of the storage racks 106 may define a cluster within the data center 105, where the data center 105 may include one or more of the clusters. Each of the storage racks 106 may include a set of nodes 104 residing thereon, where the amount of nodes per storage rack may vary. Each node 104 may be composed of hardware components that support the operation of a physical disk.

The storage racks 106 and the nodes 104 may be analogous to failure domains that may be negatively affected when a component or service associated with the data center 105 experiences problems. Each node 104 may have shards assigned thereto according to a key-value pair of the respective shards (i.e., a key-value pair of a shard dictates which node that shard is assigned). Each shard may have one or more replicas of data objects, thus providing protection against data loss if a node hosting a replica of the shard fails, and providing the ability to scale by balancing requests to data in a shard among its replicas.

The system 100 may further include one or more clients 110 configured to access the data center 105 and features thereof via one or more networks 102. It should be appreciated that the network 102 may be any type of wired or wireless LAN, WAN, or the like. For example, the network 102 may be the Internet, or various corporate intranets or extranets. In embodiments, each of the clients 110 is a dedicated computer machine, workstation, or the like, including any combination of hardware and software components. Further, a user such as a developer, engineer, supervisor, or the like (generally, a "customer") may interface with any of the clients 110 to access the data center 105 and input or set various configuration parameters.

A distributed database management system (DBMS) 103 may be configured to manage the distributed database of the data center 105, whereby the DBMS 103 may be stored on one or more centralized computers within the system 100. In one particular implementation, according to the present embodiments, the DBMS 103 may include an analysis server 101 capable of balancing data objects stored on the resources of the distributed database. As used herein, a data object may refer to any amount, segment, or portion of data designated for storage in the distributed database.

The analysis server 101 may be configured to identify or calculate an RDF for a given node that equals a number of nodes that share data with that given node, including the given node itself. Thus, an RDF value may be any numerical representation of a potential effect(s) of a node's failure on other nodes in the system. For example, the RDF may be an indication of how many other nodes may be affected by the failure of a node in the system. It should be appreciated that the analysis server 101 may use various formulas, calculations, algorithms, techniques, methods, or the like to calculate an RDF value. The analysis server 101 can also enable users or customers to interface with the various components and modules to input parameter(s) and/or monitor processing of the analysis server 101. For example, the analysis server 101 may be configured to receive the RDF value from a user, as part of a storage request, as a predefined value by a designer of the storage cluster, and/or from any other source.

Generally, some storage frameworks having a lower RDF value may be less flexible in rebuilding a new node by copying data to the new node because there are less nodes from which data is copied. As a result, data recovery time may be longer if the RDF was larger. However, a higher RDF may result in a higher risk of permanently losing data. If all nodes in a cluster of size N share some part of data from any given node, then the RDF is equal to N. In this case, if a smaller number of nodes (larger than or equal to a number of replicas of a given portion of data) die permanently, some data may be permanently lost as these dead nodes may be the only nodes that store a given portion of data. Thus, there is a trade-off in determining the RDF so that it should neither be too large nor too small.

According to the present embodiments, the analysis server 101 may implement various platforms, techniques, algorithms, or the like (generally, a "data distribution technique") to determine how to distribute data objects across the nodes 104 of the distributed database. The data distribution technique may, in some scenarios, be used to maximize diversity across failure domains. The data distribution technique may include three portions or levels: a node balancer technique, a shard balancer technique, and a replica balancer technique, where the analysis server 101 may execute the three portions in order.

According to embodiments, the analysis server 101 may implement the node balancer technique to create a set of pods from the set of nodes 104 residing across the set of storage racks 106. In particular, the analysis server 101 may create each pod by assigning, to the pod, a portion of the nodes 104 to maximize diversity of the set of storage racks 106 represented in the pod, thus achieving better RDF. Further, the analysis server 101 may assign the set of nodes 104 to the set of pods to meet the required number of nodes assigned to a pod. In this regard, rack diversity is maximized per pod to provide better flexibility in placing replicas. Further, the maximum RDF is limited to the number of nodes within a pod to avoid a high risk of permanently losing data. Additionally, the node balancer technique may ultimately enable the storage resources to achieve a predefined replication factor ("RF," or the number of replicas per shard).

The analysis server 101 may also implement the shard balancer technique to determine which shards are assigned to which pods so that each pod has a similar shard weight relative to its respective capacity. After the analysis server implements the node balancer technique, various of the pods may be overloaded with shards (i.e., are above an average relative load) and various of the pods may be underloaded (i.e., are below an average relative load). Accordingly, the analysis server 101 may facilitate the shard balancer technique to move or reassign shards from overloaded pods to underloaded pods.

The analysis server 101 may further implement the replica balancer technique for each of the pods to ensure that replicas are assigned to appropriate nodes. In implementing the replica balancer technique, the analysis server 101 may ensure that the replicas of a given shard are assigned to nodes of different storage racks. Thus, the analysis server 101 may achieve load balance by distributing shards evenly among the nodes while maximizing RDF and minimizing the range of shard overlap factor (SOF) (i.e., the number of shards overlapped between a pair of nodes) within each pod.

Figure 2:
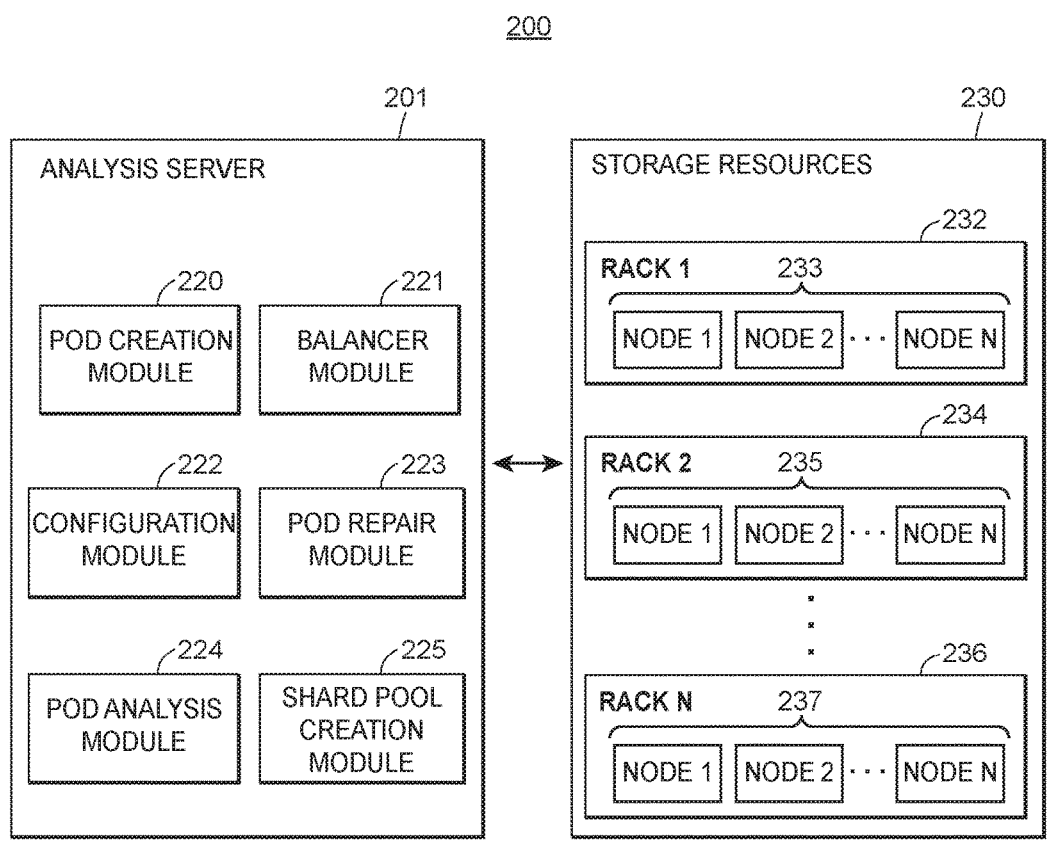
FIG. 2 depicts various components associated with a distributed database and managing storage resources thereof, in accordance with some embodiments.

FIG. 2 illustrates a general system architecture of a system 200 for storage resource balancing. The components of the system 200 may be implemented on an analysis server 201 such as the analysis server 101 as described with respect to FIG. 1. Although FIG. 2 illustrates the components of the system 200 as being implemented on a singular server, it should be appreciated that different components or groups of components may be implemented on different servers.

The analysis server 201 may interface with a set of storage resources 230, such as via a network connection. As depicted in FIG. 2, the set of storage resources 230 may include a set of storage racks 232, 234, 236 ("Rack1," "Rack2," and "RackN"). Each of the set of storage racks 232, 234, 236 may have a set of nodes residing thereon. In particular, as illustrated in FIG. 2, a set of nodes 233 resides on the storage rack 232, a set of nodes 235 resides on the storage rack 234, and a set of nodes 237 resides on the storage rack 236. It should be appreciated that fewer or additional storage racks and/or nodes residing thereon are envisioned.

The analysis server 201 may implement a set of modules configured to facilitate the various balancing functionalities: a pod creation module 220, a balancer module 221, a configuration module 222, a pod repair module 223, a pod analysis module 224, and a shard pool creation module 225. It should be appreciated that the set of modules may include alternate or additional modules, that multiple of the set of modules may be combined (e.g., the pod analysis module 224 and the configuration module 222 may be combined in a single module), and that the set of modules may be implemented on multiple servers or components.

In operation, the set of modules of the analysis server 210 may interface with the storage resources 230 to retrieve certain configuration data and implement the three balancing techniques: the node balancer technique, the shard balancer technique, and the replica balancer technique. Specifically, the pod creation module 220 may be configured to create a set of pods from the sets of nodes 233, 235, 237 residing across the sets of storage racks 232, 234, 236. Additionally, the balancer module 221 may be configured to distribute shards among the created pods based on available capacities of the created pods, and distribute replicas of the shards among nodes within the created pods. Further, the configuration module 222 may be configured to calculate certain configuration parameters associated with balancing the storage resources 230. In particular, the configuration module 222 may calculate the specified amount of nodes for each pod based on one or more of: an incoming network bandwidth, an outgoing network bandwidth, an amount of replicas of each of the shards, an annualized failure rate, and a storage capacity of each of the nodes.

The pod repair module 223 may be configured to determine instances of pod failure or when a pod may need repair, and may correspondingly identify and reassign certain nodes to the pod to repair the pod. The pod analysis module 224 may be configured to facilitate the shard balancer technique by determining or calculating relevant metrics including shard weights, pod capacities, global average loads, and respective total weights of sets of shards. The pod analysis module 224 may use the calculated metrics to determine which of the set of pods are overloaded and which of the set of pods are underloaded. The shard pool creation module 225 may be configured to create a shard pool by removing a portion of shards from the overloaded pods. The balancer module 221 may assign the shards of the shard pool to the underloaded pods. It should be appreciated that the modules of the analysis server 201 may be configured to perform additional functionalities, as further described herein.

Prior to initiating the node balancer technique, the pod creation module 220 may determine, calculate access, or otherwise be configured with the following parameters: targeted pod width (i.e., number of nodes per pod), rack diversity (i.e., representation of storage racks within a pod), and theoretical RDF, where the targeted pod width may be a hard requirement while the rack diversity and theoretical RDF may be lower-bound targets (i.e., the actual pod width should be exactly the same as the targeted pod width, while the rack diversity and the theoretical RDF need to be greater than or equal to their targeted values). According to embodiments, the parameters may be default values or may be specified by a user.

In some implementations, each of the pod width and the number of storage racks in a pod must be greater than or equal to the predefined RF, as replicas of a shard must be in different failure domains (where nodes and storage racks may be considered failure domains). Further, the rack diversity of a pod must be greater than the predefined RF to enable the shard assigned to the pod to achieve the predefined RF. Generally, the theoretical RDF of a node may be the maximum RDF that a given node of a storage rack may achieve, where the theoretical RDF of a pod may be the minimum of the theoretical RDF of all of the nodes in a pod. It may be beneficial for the rack diversity and the theoretical RDF to be as high as possible, as a higher rack diversity and/or theoretical RDF of one pod may lead to the possibility of higher metrics in other pods. The upper limit of the RDF in a pod is equal to the pod width, as nodes in a different pods do not share data (i.e., the maximum RDF of a node is equal to the number of nodes in other storage racks in the pod that contain the node).

Figure 3:
FIG. 3 depicts exemplary processing associated with creating pods using various storage resources, in accordance with some embodiments.
Figure 3:

FIG. 3 depicts exemplary node balancer processing 300 that may be facilitated by a pod creation module (such as the pod creation module 220 as discussed with respect to FIG. 2), and/or additional components. Prior to the pod creation module initiating the processing 300, it may be assumed that a total of three (3) pods are to be created from nodes residing across a total of five (5) storage racks. Further, the pod creation module is configured to assign a total of eight (8) nodes to each pod (i.e., the targeted pod width is eight). Each of the storage racks may have different amounts of nodes residing thereon. For example, as illustrated in FIG. 3, Rack1 may have seven nodes (1-7), Rack2 may have six nodes (1-6), Rack3 may have five nodes (1-5), Rack4 may have five nodes (1-5), and Rack5 may have three nodes (1-3). It should be appreciated that the processing 300 is merely exemplary and that different configurations and parameters are envisioned.

The processing 300 may be segmented into three distinct steps, one for the creation of each pod: Step 1 (340), Step 2 (342), and Step 3 (344). Prior to each step, the pod creation module may sort the storage racks in descending order according to the number of spare nodes included in each storage rack. For example, prior to Step 1 (340), the pod creation module may sort the storage racks in the following order: Rack1, Rack2, Rack3, Rack4, and Rack5. The pod creation module may also be configured to select which nodes are assigned to which pods using a "round-robin" technique where the pod creation module may assign nodes from different storage racks having spare nodes before assigning multiple nodes from the same storage rack.

As illustrated in Step 1 (340) of FIG. 3, the pod creation module may create Pod 1 by assigning the following eight (8) nodes to Pod 1: nodes 1 and 2 from Rack1, nodes 1 and 2 from Rack2, nodes 1 and 2 from Rack3, node 1 from Rack4, and node 1 from Rack5. In particular, to comply with the round-robin technique, the pod creation module may assign the nodes to Pod 1 in the following order: node 1 from Rack1, node 1 from Rack2, node 1 from Rack3, node 1 from Rack4, node 1 from Rack5, node 2 from Rack1, node 2 from Rack2, and node 2 from Rack3. After creating Pod 1, the pod creation module may sort the storage racks in descending order according to the number of spare nodes included in each storage rack. Because Rack4 has more spare nodes (4) than does Rack3 (3), the pod creation module may sort the storage racks in the following order: Rack1, Rack2, Rack4, Rack3, and Rack5.

After sorting the storage racks, the pod creation module may create Pod 2 as illustrated in Step 2 (342) of FIG. 3, where the pod creation module assigns the following eight (8) nodes to Pod 2: nodes 3 and 4 from Rack1, nodes 3 and 4 from Rack2, nodes 2 and 3 from Rack4, node 3 from Rack3, and node 2 from Rack5. In particular, to comply with the round-robin technique, the pod creation module may assign the nodes to Pod 2 in the following order: node 3 from Rack1, node 3 from Rack2, node 2 from Rack4, node 3 from Rack3, node 2 from Rack5, node 4 from Rack1, node 4 from Rack2, and node 3 from Rack4. After creating Pod 2, the pod creation module may sort the storage racks in descending order according to the number of spare nodes included in each storage rack. In the particular example, there is no change in the sorting of the storage racks. Accordingly, the pod creation module may maintain the following order: Rack1, Rack2, Rack4, Rack3, and Rack5.

The pod creation module may create Pod 3 as illustrated in Step 3 (344) of FIG. 3, where the pod creation module assigns the following eight (8) nodes to Pod 3: nodes 5 and 6 from Rack1, nodes 5 and 6 from Rack2, nodes 4 and 5 from Rack4, node 4 from Rack3, and node 3 from Rack 5. In particular, to comply with the round-robin technique, the pod creation module may assign the nodes to Pod 2 in the following order: node 5 from Rack1, node 5 from Rack2, node 4 from Rack4, node 4 from Rack3, node 3 from Rack5, node 6 from Rack1, node 6 from Rack2, and node 5 from Rack4. After the pod creation module assigns the nodes to Pod 3, there are two remaining spare nodes: node 7 from Rack1 and node 5 from Rack3. In embodiments, the pod creation module may add the remaining spare nodes to a spare node pool for use in repairing pods.

In some circumstances, one or more nodes of a pod may fail, whereby the pod becomes underfilled and needs to be repaired with one or more spare nodes. One or more modules or components of the analysis server 201 may facilitate the pod repair functionality. In one particular implementation, the pod repair module 223 as discussed with respect to FIG. 2 may facilitate the pod repair functionality.

If there are multiple failed pods, the pod repair module may first identify the pod with the lowest pod width (i.e., the most underfilled pod) as the primary or first pod to repair. As the pod repair module adds new node(s) to that first pod, there may be other pods in need of repair that have a lower pod width at that particular point in time. Accordingly, the pod repair module may identify the pod with the lowest pod width (i.e., the most underfilled pod) each time after adding a spare node to a pod previously identified as having the lowest pod width.

After identifying the pod with the lowest pod width, the pod repair module may identify a spare node to add to the identified pod. To identify the spare node to add to the pod, the pod repair module may account for a set of rules having different priorities. In particular, the pod repair module may first select a spare node that can increase the rack diversity of the pod. If no such spare node exists, the pod repair module may second select a spare node that can increase the theoretical RDF of the pod. If no such spare node exists, the pod repair module may third select a spare node from the storage rack having the maximum number of spare nodes. If there are multiple spare node candidates that can increase the rack diversity of the pod or the theoretical RDF of the pod, the pod repair module may select a spare node from the storage rack having the most such type of spare nodes.

After the pod creation module creates the set of pods, each created pod has a set of shards assigned thereto, each with a potentially different RF, where each created pod further has a storage capacity. The capacity of a pod is the total amount of data that the pod can hold (i.e., a sum of the storage capacities of the nodes of a pod). The storage capacity of a node is the amount of data objects that the node can store. Additionally, the set of shards assigned to each pod has a corresponding weight. Generally, each replica of the same shard has the same weight, while replicas of different shards may have different weights. Accordingly, it may be beneficial to reassign shards among the set of pods to balance the weights of the pods.

A pod analysis module (such as the pod analysis module 224 as discussed with respect to FIG. 2) may be configured to facilitate at least a portion of the shard balancer technique, where the shard balancer technique may specify a set of rules or goals. In particular, the shard balancer technique may establish that all replicas of a shard must move as a whole while (i) keeping each pod's relative load (or the total weight of all shards in a pod divided by the capacity of the pod) as close as possible to the relative load(s) of other pod(s), and (ii) keeping the number of shard movements to a minimum. Additionally, the shard balancer technique may establish that when one pod's capacity is changed, data movements should happen to or from that pod.

In an implementation, the pod analysis module may execute a subset of the steps of the shard balancer technique at a time. In an implementation, the system may be designed with a constraint that each data movement across any two pods (one movement out and one movement in) in an iteration may have a max cap so as to reflect any real-world restrictions such as available network bandwidth and/or other restrictions. Given this requirement, if the pod analysis module generates a sequence of data movements that will result in a larger data transfer from one pod to another pod, then the pod analysis module may be forced to execute a subset of data movements in order to guarantee the max cap across any two pods per iteration. Because the pod analysis module may pick a subset of movements to execute at a time, the pod analysis module may invoke the shard balancer technique multiple times (i.e., each time executing a subset of movements) while still maintaining convergence (i.e., when nothing is changing in the cluster, the pod analysis module must eventually stop moving shards) and idempotency (i.e., the pod analysis module must produce the same shard to pod assignments given the same inputs).

As an initial step of the shard balancer technique, the pod analysis module may calculate a global average relative load across all of the set of pods:

$$\text{global average relative load(GARL)} = \text{sum}\{w_1, \ldots, w_n\}/\text{sum}\{c_1, \ldots, c_n\} \quad (1)$$

In equation (1), $\{w_1, \ldots, w_n\}$ is a set of the total weight of all shards in the set of pods $\{1\text{-}n\}$, and $\{c_1, \ldots, c_n\}$ is a set of the pod capacity of the set of pods $\{1\text{-}n\}$. The GARL is thus the global average relative load across all pods under consideration by the pod analysis module, calculated as the sum of a set of the total weight (i.e., occupied storage) of all shards in the pods divided by a sum of a set of the pod capacities of the pods. The GARL indicates a current snapshot of the average amount of occupied storage across the pods, where the balancer module may use the calculated GARL to determine the balancing action to take based on the current snapshot. The pod analysis module may further calculate a headroom amount for each of the pods:

$$\text{headroom amount}_i = \text{GARL} * c_i - w_i \quad (2)$$

A headroom amount of a pod is the load of the pod relative to the GARL. Based on the headroom amount, the pod analysis module may determine if each pod is underloaded, overloaded, or balanced. An overloaded pod is a pod having a load (the total weight of all shards in the pod divided by the capacity of the pod) that is greater than the GARL of the pods under consideration by the pod analysis module. An overloaded pod has a negative headroom amount. In contrast, an underloaded pod is a pod having a load (the total weight of all shards in the pod divided by the capacity of the pod) that is less than the GARL of the pods under consideration by the pod analysis module. An underloaded pod has a positive headroom amount. A balanced pod is a pod having a load (the total weight of all shards in the pod divided by the capacity of the pod) that is equal to the GARL of the pods under consideration by the pod analysis module. A balanced pod has a headroom amount equal to zero.

Figure 4A:
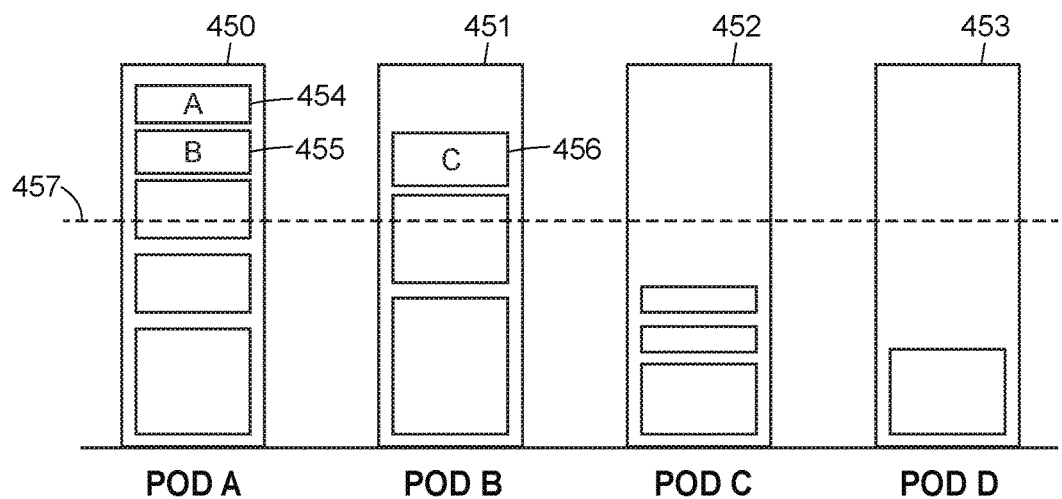
FIGS. 4A-4D depicts exemplary processing associated with balancing shards among pods, in accordance with some embodiments.

FIG. 4A illustrates a set of exemplary pods after creation by the pod creation module: Pod A 450, Pod B 451, Pod C 452, and Pod D 453. Each of the pods 450-453 has a set of shards assigned thereto. In particular, as illustrated in FIG. 4A, Pod A 450 has five (5) shards assigned thereto, including shard A 454 and shard B 455, Pod B 451 has three (3) shards assigned thereto, including shard C 456, Pod C 452 has three (3) shards assigned thereto, and Pod D 453 has one (1) shard assigned thereto. FIG. 4A includes a dashed line 457 that represents the GARL of the pods 450-453. Because each of Pod A 450 and Pod B 451 has a total shard weight that is greater than the GARL (and accordingly a headroom amount that is negative), Pod A 450 and Pod B 451 are overloaded. Similarly, because each of Pod C 452 and Pod D 453 have a total shard weight that is less than the GARL (and accordingly a headroom amount that is positive), Pod C 452 and Pod D 453 are underloaded.

According to embodiments, a shard pool creation module (such as the shard pool creation module 225 as discussed with respect to FIG. 2) may be configured to facilitate an additional portion of the shard balancer technique. In particular, the shard pool creation module may create a shard pool that includes shards from pods that are overloaded. A shard pool is a set/grouping that includes shards from pods that are overloaded, according to a current snapshot of the overloaded pods. Before identifying such shards for the shard pool, the shard pool creation module may initialize the shard pool to be empty. Then, the shard pool creation module may cycle through each pod to identify any shards to add to the shard pool, skipping any pod that is not overloaded (i.e., is either balanced or underloaded).

Figure 4B:
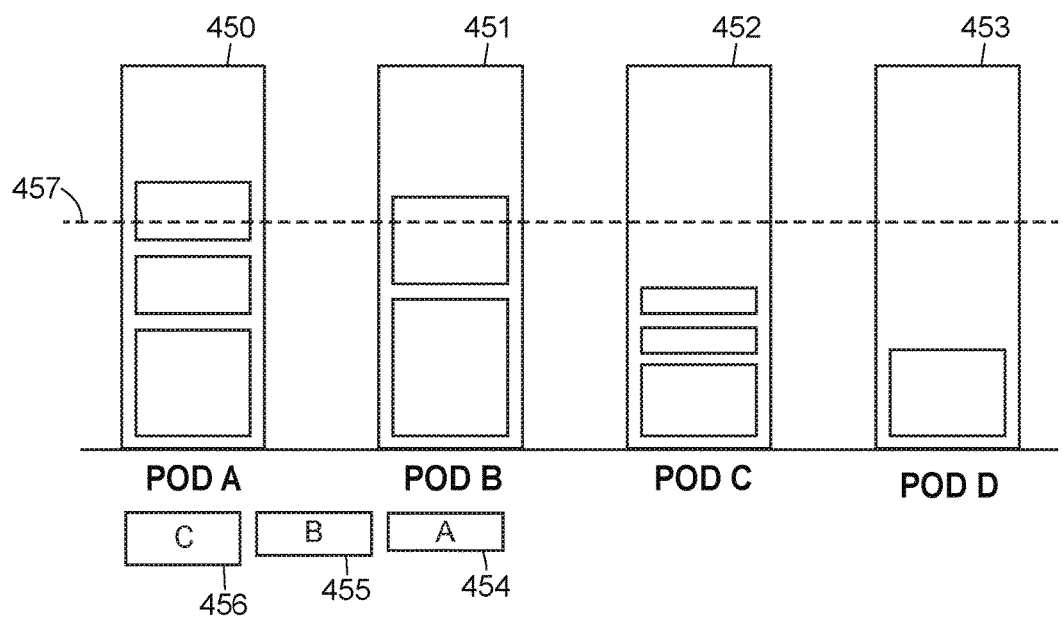

After identifying a pod that is overloaded, the shard pool creation module may remove that pod's shards one-by-one from lightest weight to heaviest weight until the headroom amount of the pod is zero (i.e., the pod is balanced) or still negative (i.e., is still overloaded), but removing an additional shard would result in the headroom amount of the pod becoming positive (i.e., would result in the pod becoming underloaded). Accordingly, after the shard pool creation module removes the shards from all of the pods, each of the pods will have at most one shard that contributes to the respective pod being overloaded. The shard pool creation module may add each of the removed shards to the shard pool. Removed shards are thus added to the shard pool as candidates for reassignment to underloaded pods. FIG. 4B illustrates the set of pods 450-453 after the shard pool creation module removes the applicable shards. In particular, the shard pool creation module has removed shard A 454 and shard B 455 from pod A 450, and shard C 456 from pod B 451. Accordingly, the shard pool consists of shard A 454, shard B 455, and shard C 456.

Figure 4C:
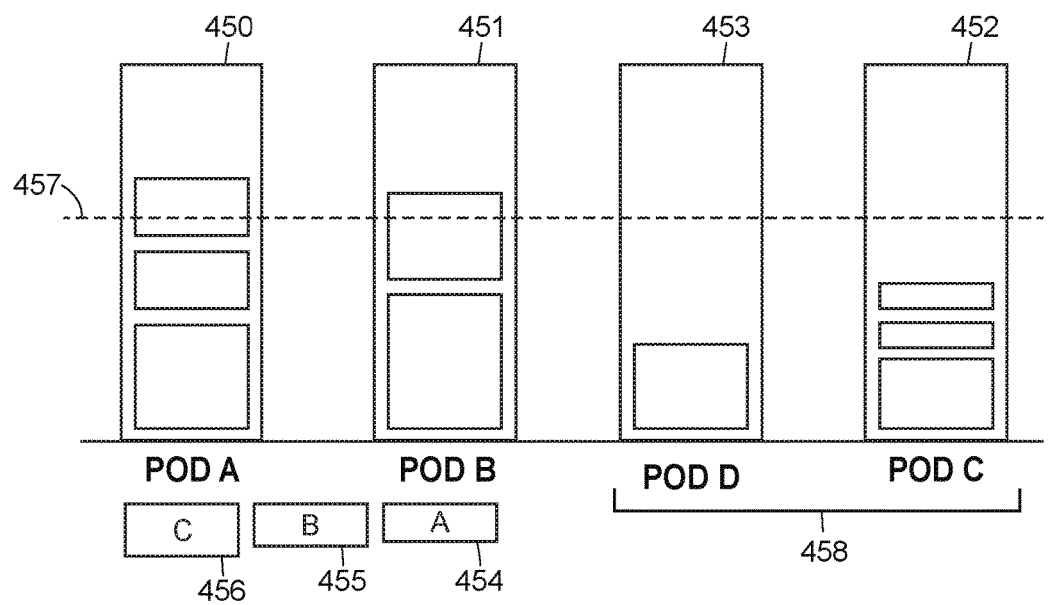

After creating the shard pool, the shard pool creation module may sort the shards of the shard pool according to shard weight from heaviest to lightest. In the example illustrated in FIG. 4B, the sorted shard pool includes the following shards in order: shard C 456, shard B 455, and shard A 454. Further, the shard pool creation module (or another module) may generate a priority queue to organize the underloaded pods (i.e., the pods that have positive headroom) to which shards from the shard pool are assigned. According to some embodiments, the priority queue may be a tree-based data structure such as a max heap that satisfies the property: the value of a root node is greater than or equal to either of its children. The priority queue may be sorted or organized by the respective headroom amount of the underloaded pods. FIG. 4C illustrates the set of pods 450-453 after the shard pool creation module generates a priority queue 458. As illustrated in FIG. 4C, the priority queue 458 includes Pod D 453 ordered first and Pod C 452 ordered second, as Pod D 453 has a greater headroom amount than does Pod C 452.

After sorting the shards in the shard pool and creating the priority queue with the underloaded pods, the shard pool creation module may assign the shards of the shard pool to the underloaded pods included in the priority queue. In particular, the shard pool creation module may pop a pod (i.e., the most underloaded pod) from the priority queue, and assign a shard (i.e., the shard with the highest weight) from the shard pool to the pod. If the pod is still underloaded, the shard pool creation module may reassign the pod to the priority queue. The shard pool creation module may iterate through the shard pool and the priority queue in this manner until the shard pool is empty (i.e., until all of the shards have been assigned to the pods included in the priority queue).

Figure 4D:
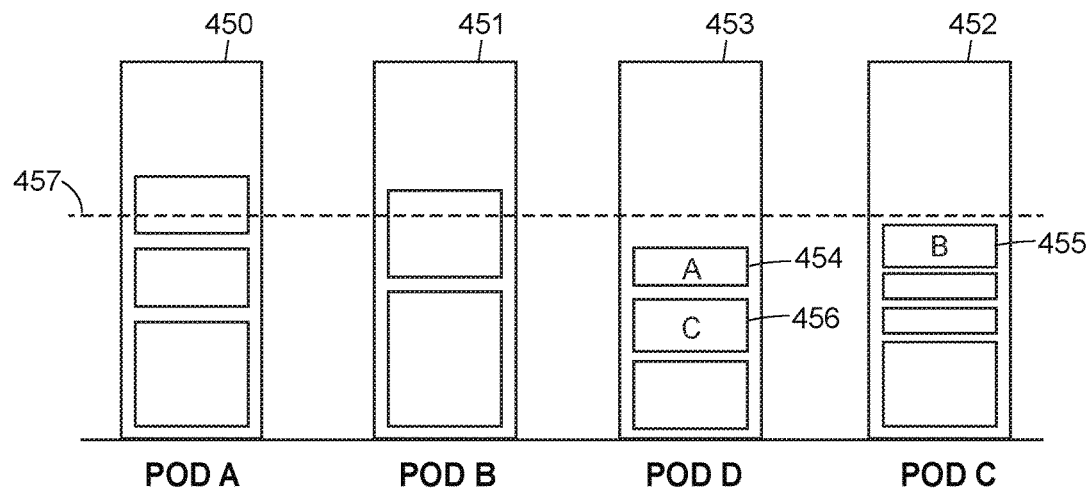

FIG. 4D illustrates the set of pods 450-453 after the shard pool creation module assigns the shards from the shard pool. In particular, the shard pool creation module first assigns shard C 456 (i.e., the heaviest unassigned shard) to Pod D 453 (i.e., the most underloaded pod in the priority queue) and reassigns Pod D 453 to the priority queue, then assigns shard B 455 (i.e., the heaviest unassigned shard) to Pod C 452 (i.e., the most underloaded pod in the priority queue), and then assigns shard A 454 (i.e., the heaviest and only remaining unassigned shard) to Pod D 453 (i.e., the most underloaded and only pod included in the priority queue). After the shard pool creation module assigns the shards from the shard pool, there are two overloaded pods (Pod A 450 and Pod B 451) and two underloaded pods (Pod D 453 and Pod C 452), with the average headroom amount of the pods 450-453 approximately equal to the GARL calculated in equation (1).

The shard balancer technique has many beneficial properties, even when invoked multiple times. In particular, the shard balancer technique (i) is deterministic because pods and shards are consistently ordered, (ii) is idempotent, (iii) minimizes data movements across pods, (iv) achieves reasonably good results, and (v) needs only basic data structures (e.g., a priority queue), thus making implementation efficient. Additionally, the shard balancer technique is consistently converging. In particular, even when invoked multiple times, the shard balancer technique may guarantee the following: (i) the total amount of data movements will not change, (ii) all data movements are predictable given the initial state, (iii) each data movement is progressing towards better load balancing, and (iv) a shard will either not move, or move at most once.

After the shard pool creation module reassigns the shards from the overloaded pods to the underloaded pods, the analysis server may need to implement the replica balancer technique to balance the replicas of the data objects within the individual pods. Although the RDF of a given node indicates the amount of other nodes in a pod that are sharing shards with the given node, the RDF does not convey metrics such as how evenly the replicas of shards on the given node are distributed among other nodes, how much rack diversity there is in the nodes that share shards with the given node, or how even is the rack diversity of the nodes that share shards with the given node.

Accordingly, the analysis server may employ a shard overlap factor (SOF) which may be defined as the number of shards that overlap between two racks ("rack SOF") or between two nodes ("node SOF"). Accordingly, for a pod with "n" nodes, there is a combination of (n, 2) SOFs. Effectively, the higher the maximum SOF in a pod, the more data a node pair within the pod shares and the less chance for other node pairs within the pod to share data, resulting in a smaller RDF for the pod. Within a cluster, it is preferable to have a smaller range of SOFs (and ideally, all pairs of nodes have the same SOF value), as the larger the range is, the higher the variance of load distribution.

To facilitate the replica balancer technique, a balancer module (such as the balancer module 221 as discussed with respect to FIG. 2) may establish that the replica(s) of a shard be assigned to node(s) from different storage racks (i.e., failure domains). Further, the balancer module may attempt to keep both the space usage of each node and the space usage of each storage rack as even as possible. Additionally, the balancer module may attempt to keep the highest node SOF of all pairs of nodes as low as possible, as a lower highest node SOF leads to (i) a higher minimum RDF and (ii) a more even distribution of the overlapping shards among the nodes that overlap with a given node. Moreover, the balancer module may attempt to keep the highest rack SOF of all pairs of racks as low as possible, as a lower highest rack SOF leads to (i) higher rack diversity of the nodes that share shards with a given node and (ii) more even distribution of the overlapping shards among the racks that overlap with a given node.

The balancer module may need to facilitate the replica balancer technique in certain scenarios. First, the balancer module may need to balance replicas subsequent to an initial assignment of new shards. Second, the balancer module may need to balance replicas to repair an under-replicated shard. In particular, when there is a node failure, every replica on the failed node may be lost and the balancer module may repair the under-replicated shard by making another copy of the replica on a different node. Third, the balancer module may need to rebalance replicas when the free space distribution of a pod changes significantly. In particular, when a new node is added to a pod or shard(s) are moved in or out of the pod, the free space distribution across the nodes in the pod could change significantly. As a result, the balancer module may need to rebalance the distribution of replicas in the pod.

Generally, in facilitating the replica balancer technique, the balancer module may reassign replicas from source nodes to destination nodes, in particular by moving one replica at a time from a source node to a destination node until the free capacity of the node with the most amount of free space is equal to that of the node with the least amount of free space (or the difference is off by one). To reassign a replica, the balancer module may select a source node as the donor node, select a replica from the source node, determine a destination node for the replica, and move the replica from the source node to the destination node. These functionalities are further described herein with respect to FIG. 11.

Figure 5A:
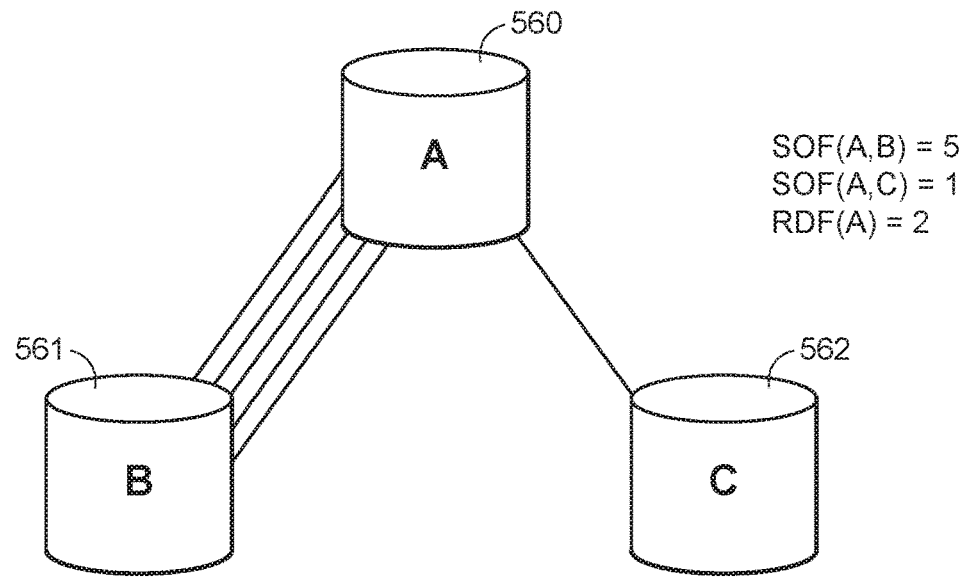
FIGS. 5A and 5B depicts exemplary processing associated with balancing replicas within pods, in accordance with some embodiments.

FIG. 5A illustrates an exemplary set of nodes (node A 560, node B 561, and node C 562) within a pod, where the replicas within the set of nodes illustrated in FIG. 5A are not balanced. In particular, the SOF between node A 560 and node B 561 is five (5), while the SOF between node A 560 and node C 562 is one (1), with the RDF of node A 560 being two (2). Node A 560 and node B 561 therefore share too many shards while node A 560 and node C 562 share too few shards.

Figure 5B:
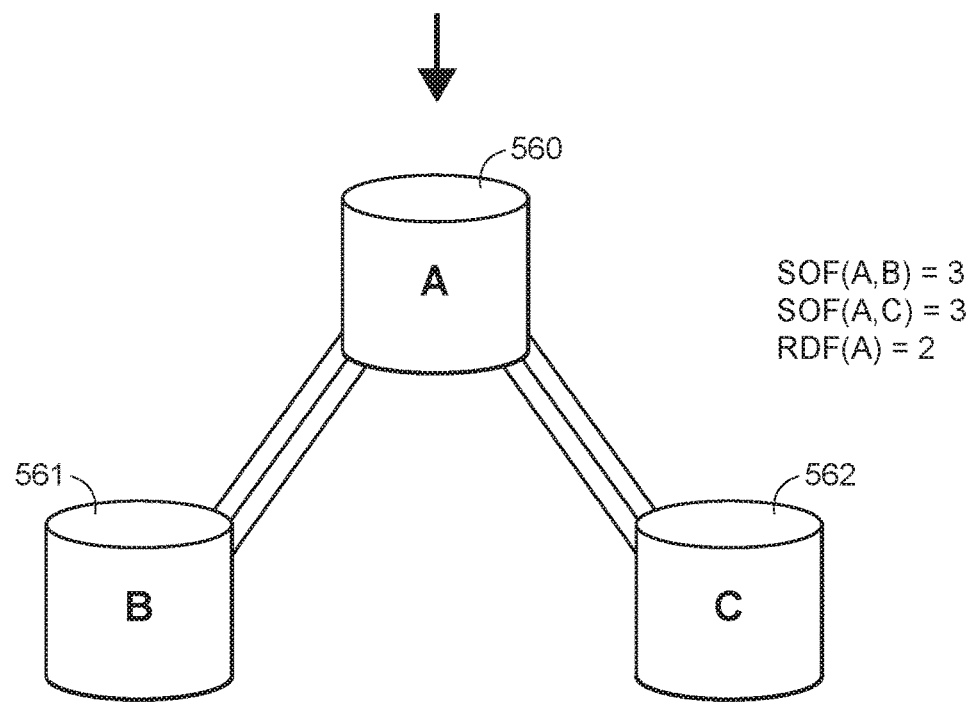

To balance the set of replicas within the pod, the balancer module may reassign replicas among the set of nodes 560-562. FIG. 5B illustrates the set of nodes 560-562 after the balancer module balances the set of replicas. In particular, the balancer module may reassign two (2) replicas from node B 561 to node C 562. Accordingly, the SOF between node A 560 and node B 561 is three (3), and the SOF between node A 560 and node C 562 is also three (3), with the RDF of node A 560 being two (2).

Figure 5C:
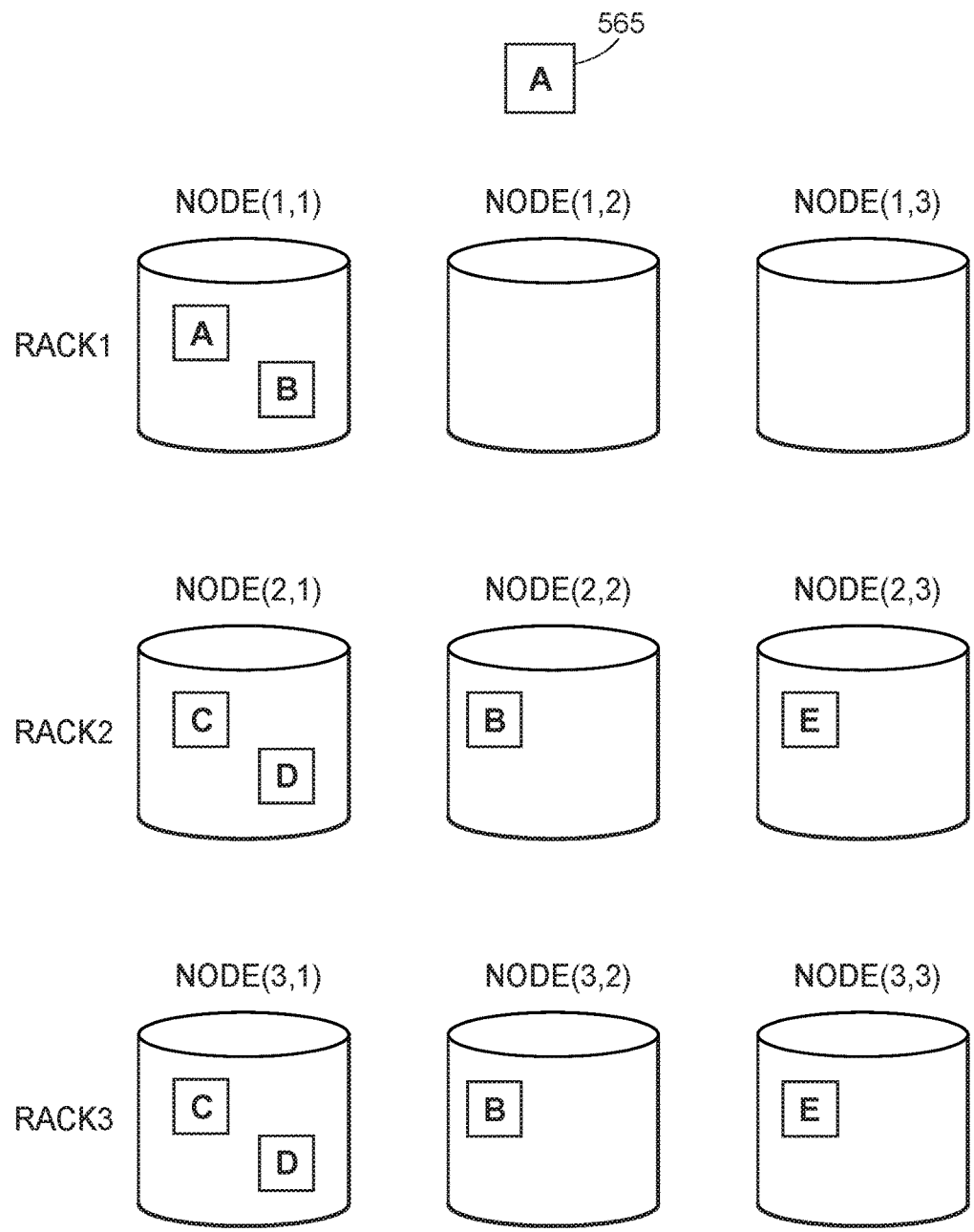
FIG. 5C depicts additional exemplary processing associated with balancing replicas within pods, in accordance with some embodiments.

The balancer module may identify a destination node for a replica according to the following criteria, in order: (1) least node load, 2) least maximum node SOF, and 3) least maximum rack SOF. FIG. 5C illustrates exemplary functionality related to identifying a destination node, according to this criteria, to which to assign a replica 565 of shard A. For purposes of explanation, it may be assumed that a pod has nine (9) nodes across three (3) storage racks, where there are already replicas assigned to the nodes as illustrated in FIG. 5C. It may be further assumed that all of the replicas have the same weight.

The balancer module may first filter out, as a potential destination node, all nodes in rack1 (566) (i.e., node(1,1), node (1,2), and node(1,3)) because there is already a replica of shard A in node(1,1). The balancer module may further filter out, as a potential destination node, node(2,1) and node(3,1) because these nodes have more replicas than other nodes (i.e., node(2,1) and node(3,1) have a higher node load than the other nodes), thus leaving node(2,2), node(2,3), node(3,2), and node(3,3) as the least loaded nodes.

The balancer module may then determine the maximum SOF of each of the least loaded nodes. In particular, the balancer module may determine that the maximum SOF of each of node(2,2) and node(3,2) with all nodes of shard A (i.e., node(1,1)) is one (1), because each of node(1,1), node(2,2), and node(3,2) store shard B. Similarly, the maximum SOF of each of node(2,3) and node(3,3) with node(1,1) is zero (0). Therefore, if the balancer module were to assign the replica 565 of shard A to node(2,2) (or to node(3,2)), the SOF of node(2,2) (or node(3,2)) with node(1,1) would increase to two (2) while the SOF of each of node(2,3) and node(3,3) would remain zero (0). In contrast, if the balancer module were to assign the replica 565 of shard A to node(2,3) (or to node(3,3)), the SOF of node(2,3) (or node (3,3)) with node(1,1) would increase to one (1). Accordingly, the balancer module may identify, as the destination node, either node(2,3) or node(3,3).

In some implementations, the range of minimum to maximum SOF within a pod may be wide. Because the balancer module prioritizes load balance over SOF, the order of replicas in which the algorithm is applied may significantly impact the final results, such as in the case in which a replica R1 may be assigned to only node N in a set of least loaded nodes, where the current maximum SOF and RDF are increased. A better result is for the balancer module to identify another replica R2 to fit into the least loaded node N, where the assignment of replica R2 to node N would not increase the current maximum SOF and RDF.

Accordingly, the balancer module may employ the following technique, presented as follows using pseudo-code:

```
I. balanceReplicas( )
    1. replicaCandidates:=collect new and failed replicas
    2. while(replica left in replicaCandidates):
    3.    foreach replica:
    4.       bestNode:=findBestDestination(replica)
    5.       if max node SOF of bestNode is minimal in Pod
    6.          assign replica to bestNode
    7.          remove replica from replicaCandidates
    8.          break for-loop
    9.       else
   10.          bestReplica:=replica whose bestNode has the lowest SOF
   11.    if no replica assigned in for-loop
   12.       assign bestNode to bestReplica seen so far
   13.       remove bestReplica from replicaCandidates
```

In implementing balancerReplicas( ), the balancer module may group together all replicas needing destination nodes (step 1), and loop through all of the replicas (step 2). The balancer module may execute steps 3-11 to attempt to identify the best replica to assign to a destination, where the balancer module may execute steps 5 and 6 to assign the best replica to a node whose maximum SOF is the minimal in the pod, thus reducing the chance of increasing the maximum SOF. If the balancer module does not identify such a best replica, the balancer module may identify a replica whose destination has the lowest SOF among all destinations of replicas.

Although the replica balancer technique described herein accounts for the SOF metric, it should be appreciated that the analysis server may disregard SOF and/or may account for alternative or additional metrics in facilitating the replica balancer technique. In particular, the analysis server may facilitate an "inter-rack" balancer technique in which the analysis server balances replicas between different storage racks within a pod according to relative weights of the storage racks. The inter-rack balancer technique attempts to achieve better balance in terms of relative weights of the storage racks, where the relative weight of a storage rack is proportional to a total token count (i.e., relative capacity) of its nodes (e.g., relative weight of storage rack=number of replicas on the storage rack/total token count of nodes in the storage rack). Therefore, if the total token count of a storage rack is double that of another storage rack, that storage rack should host twice the number of replicas as the other storage rack.

In an implementation, processing of the inter-rack balancer technique (which the analysis server or any components thereof may implement) may include a constraint that no two replicas of a shard may reside on the same storage rack. Therefore, processing may attempt to move replicas from a storage rack with the highest relative weight to another storage rack with the lowest relative weight. However, processing may determine not to move certain of the replicas if there are already replicas of the same shards on the storage rack with the lowest relative weight. In some situations, processing may not identify a replica to move, in which case processing may determine whether to move replicas to a storage rack with the second lowest relative weight.

Figure 6A:
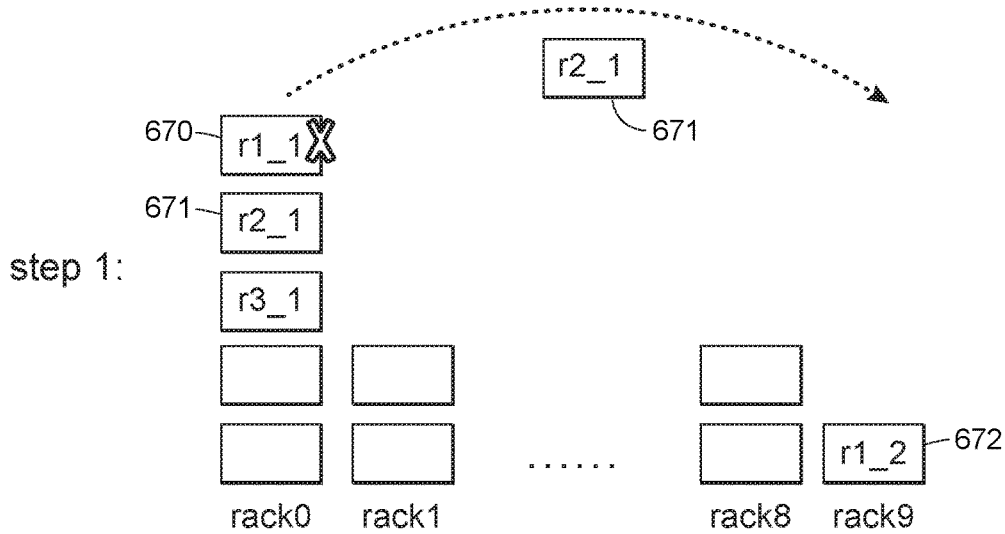
FIGS. 6A-6C depict an example implementation of an inter-rack balancer technique, in accordance with some embodiments.
Figure 6B:
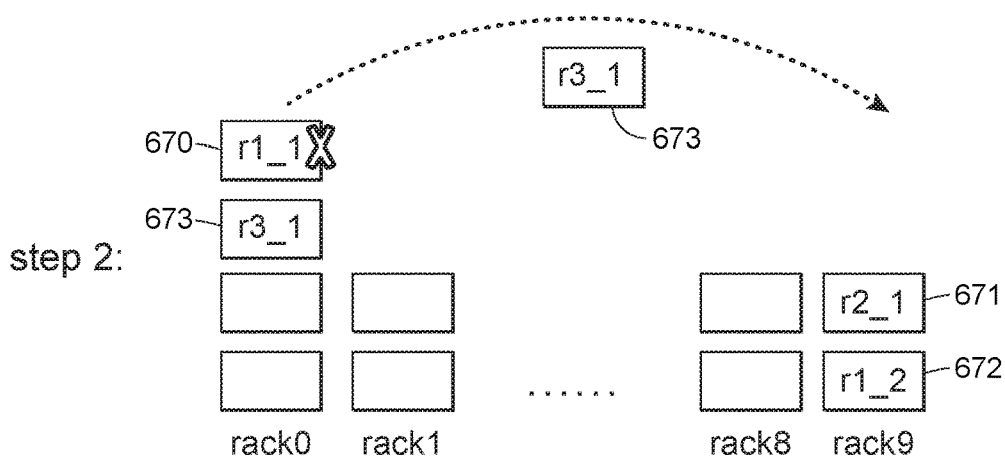
Figure 6C:
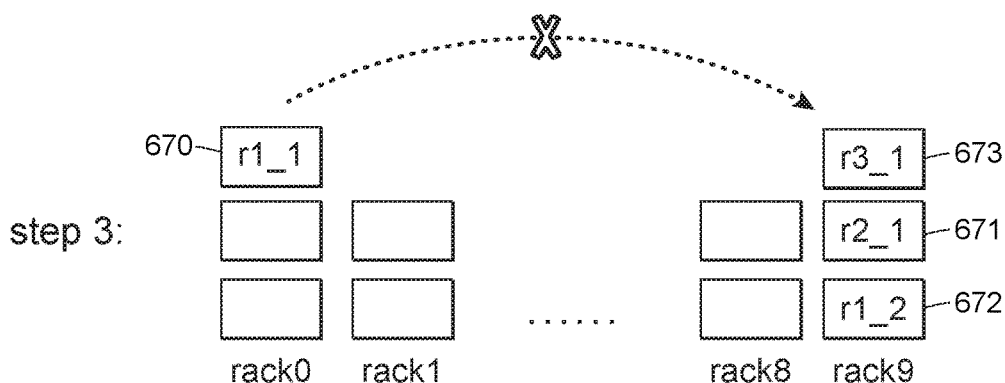

FIGS. 6A-6C detail an example facilitation of the inter-rack balancer technique. For purposes of explanation, it may be assumed that there are ten (10) storage racks that each have the same token count, where the convention "rx_y" denotes replicas of specific shards (e.g., r1_2 indicates replica 2 of shard 1). At step 1 (as depicted in FIG. 6A), rack0 has the highest relative weight while rack9 has the lowest relative weight, where processing may attempt to move a replica from rack0 to rack9. r1_1 (670) is not eligible to be moved because r1_1_2 (672) is already in rack9; as a result, r2_1 (671) may be moved from rack0 to rack9.

In some situations, there may not be a replica to move from rack0 to rack9 because rack9 may have replicas of all the same shards as rack0. Therefore, processing may determine whether there are any replicas to move from rack0 to rack8, rack7, rack6, etc., until the movement does not reduce the difference between the highest relative weight and the lowest relative weight.

At step 2 (as depicted in FIG. 6B), r3_1 (673) may be moved from rack0 to rack9. FIG. 6C depicts step 3, which is a depiction of the storage racks after processing performs step 2. At step 3, rack8 now has the lowest relative weight, while rack0 is still the rack with the highest relative weight. As depicted in FIG. 6C, it is not beneficial to move any replicas from rack0 to rack8 because doing so would not reduce the difference in relative weights between rack0 and rack8. Accordingly, it is not needed to move additional replicas and balance is achieved.

FIGS. 7A-7E detail an additional example facilitation of the inter-rack balancer technique, specifically a situation in which a storage rack has a significantly lower token count. For purposes of explanation, it may be assumed that there are ten (10) storage racks, where rack0 has ten (10) shards and a token count of ten (10), rack1 has zero (0) shards and a token count of ten (10), and racks2-9 each have zero (0) shards and a token count of one (1).

Figure 7A:
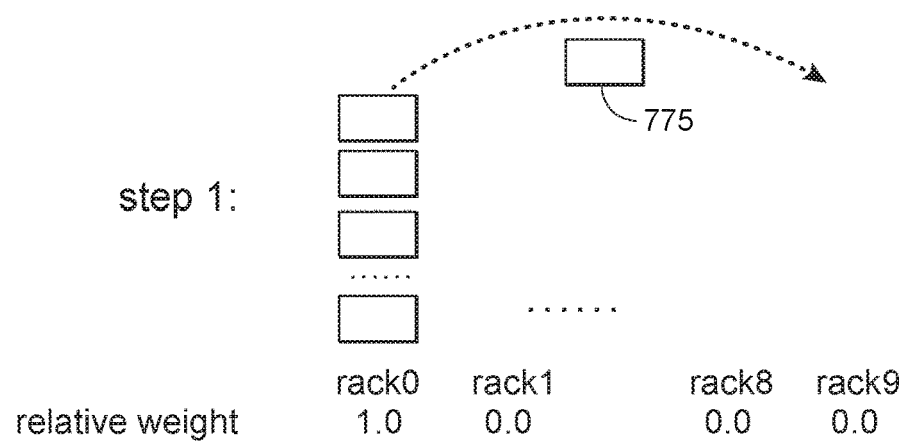
FIGS. 7A-7E depict another example implementation of the inter-rack balancer technique, in accordance with some embodiments.
Figure 7B:
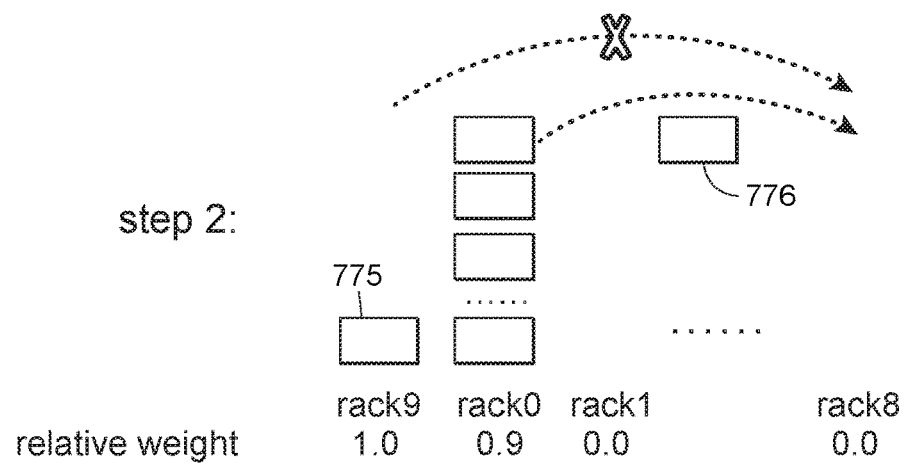

At step 1, depicted in FIG. 7A, a shard 775 is moved from rack0 to rack9. As a result, rack0 has nine (9) shards and a relative weight of 0.9, and rack9 has one (1) shard (775) and a relative weight of 1.0. At step 2, depicted in FIG. 7B, rack9 has the highest relative weight, rack0 has the second-highest relative weight, and rack8 has the lowest relative weight. It is not beneficial to move the shard 775 from rack9 to rack8 because it would not reduce the difference in relative weights between rack9 and rack8. Additionally, if processing were to stop after step 1, the storage racks are not in perfect balance because rack0 should still share shards with other storage racks, especially rack1 which has the same token count as rack0. Accordingly, processing may continue to determine whether shards should be moved from the storage rack with the second highest relative weight (namely, rack0) to the storage rack with the lowest relative weight (namely, rack8). Thus, if a shard 776 is moved from rack0 to rack8, rack0 will have eight (8) shards with a relative weight of 0.8 and rack8 will have one (1) shard (776) with a relative weight of 1.0.

Figure 7C:
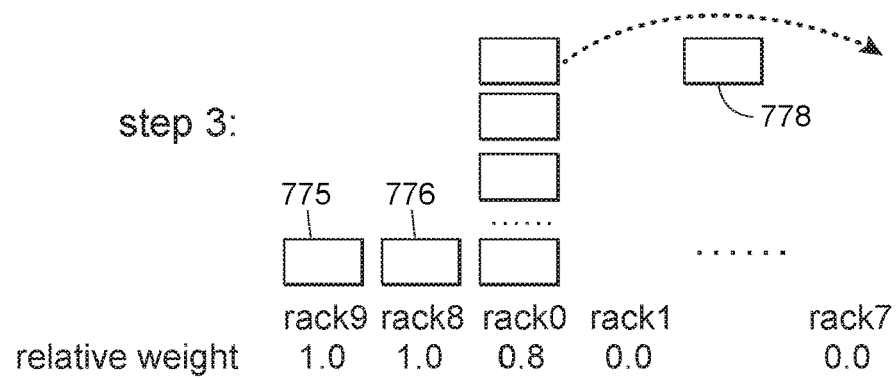
Figure 7D:
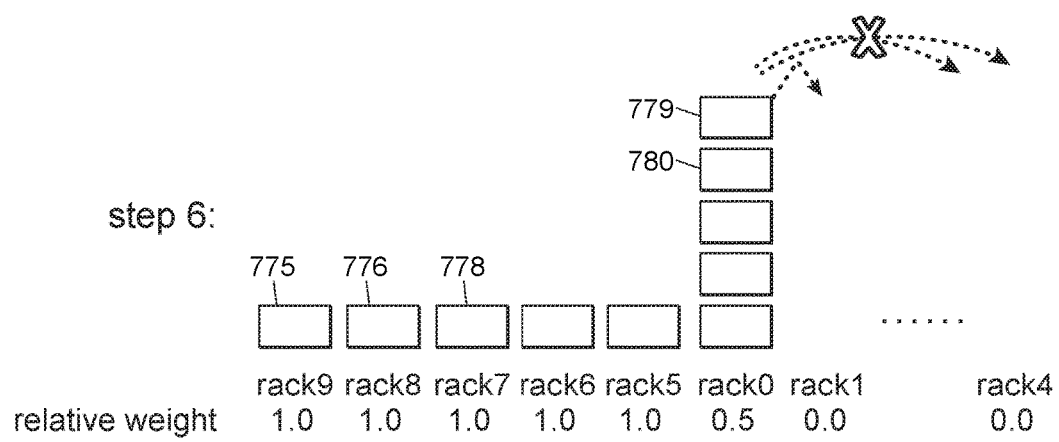
Figure 7E:
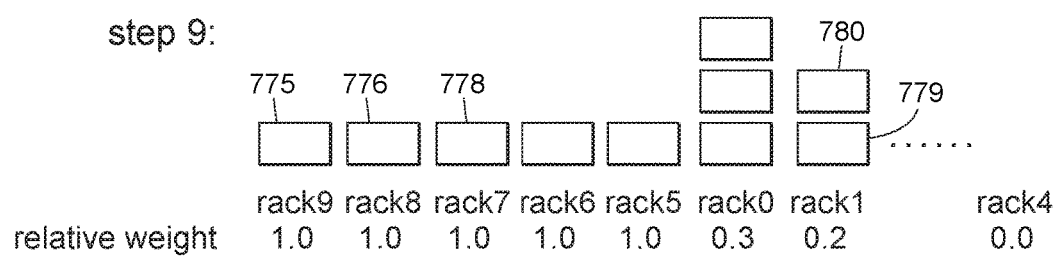

At step 3, depicted in FIG. 7C, a shard 778 is moved from rack0 to rack7. Accordingly, rack0 has seven (7) remaining shards and a relative weight of 0.7. At step 4 (not depicted), one shard is moved from rack0 to rack 6; and at step 5 (not depicted), one shard is moved from rack0 to rack5. Accordingly, at step 6, depicted in FIG. 7D, rack0 has five (5) remaining shards and a relative weight of 0.5, and racks1-4 each have zero (0) shards and a relative weight of 0.0. Processing does not move shards from rack0 to either rack2, rack3, or rack4 because doing so would not reduce the difference in relative weights between rack0 and racks2-4.

However, processing may move shards 779, 780 from rack0 to rack1 (steps 7 and 8, not depicted). In operation, processing may check rack0 with other racks in a one-by-one backward manner. To do so, processing may maintain two cursors to identify storage racks with higher and lower token count, and processing may move the two cursors toward each other until they meet. At step 9 (depicted in FIG. 7E), a balanced layout is achieved.

In some implementations, the inter-rack balancer technique may maximize the RDFs of a given storage rack (i.e., the number or storage racks sharing data with the given storage rack). In some cases, it may be possible for two storage racks to not share anything. Accordingly, the inter-rack balancer technique may apply the following criteria in order of priority: (1) the movement of replicas may not break the hard constraint that two replicas in the same storage rack do not come from the same shard, (2) the movement of replicas will increase the RDF of a destination storage rack and will not decrease the RDF of the source storage rack, (3) the movement of replicas will not decrease the minimum RDF of all storage racks in a pod, and (4) otherwise, move the first replica in a deterministic sorted order to balance the load.

According to other embodiments, the analysis server may additionally or alternatively facilitate an "inter-node" balancer technique (which the analysis server or any components thereof may implement) in which the relevant processing assigns replicas to different nodes within a single storage rack. The inter-node balancer technique attempts to achieve balance among nodes of the same storage rack in terms of relative weights, thereby attempting to maximize the RDFs of all nodes of the storage rack by swapping replicas between nodes within the storage rack.

In facilitating the inter-node balancer technique, and to achieve balance among the nodes, the relevant processing may not implement a constraint on which replicas may reside on which nodes. Further, processing may assume that nodes have similar token counts (or otherwise that they do not dramatically differ). According to embodiments, processing may implement at least some portions of the shard balancer technique in facilitating the inter-node balancer technique to balance replicas between nodes within a storage rack.

In some situations, after processing achieves balance of a storage rack, the RDF of the nodes may not be maximized.

Figure 8:
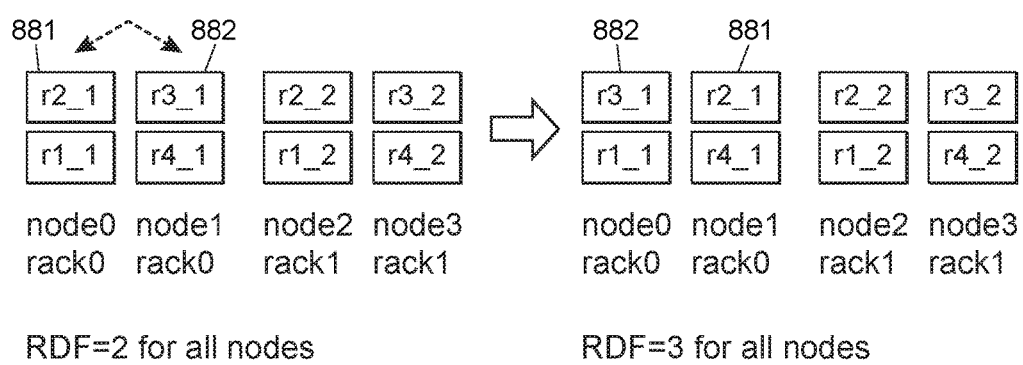
FIG. 8 depicts an example implementation of an inter-node balancer technique, in accordance with some embodiments.

FIG. 8 depicts an example facilitation of one such situation. For purposes of explanation, it may be assumed that there are four (4) shards (with two (2) replicas each) in two (2) storage racks with two (2) nodes, whereby node0 in rack0 shares data only with node2 in rack1, and node1 in rack0 shares data only with node3 in rack1. Therefore, the RDF is two (2) for all of the nodes. As depicted in FIG. 8, processing may swap r2_1 (881) in node0 with r3_1 (882) in node1. As a result, the RDF is three (3) for all of the nodes while the relative weights of the nodes do not change.

In determining whether to implement this functionality of the inter-node balancer technique, processing may arrange the storage racks by the number of nodes (e.g., least number of nodes to the most number of nodes). Processing may then check all pairs of nodes, rack by rack, to determine whether swapping replicas between them will result in an increased RDF. Processing may then use the following criteria to select replicas to swap, in the order of priority: (1) the swap of two replicas can increase the RDF of both nodes, and (2) the swap of two replicas can increase the RDF of one node but not decrease the RDF of the other node.

Figure 9:
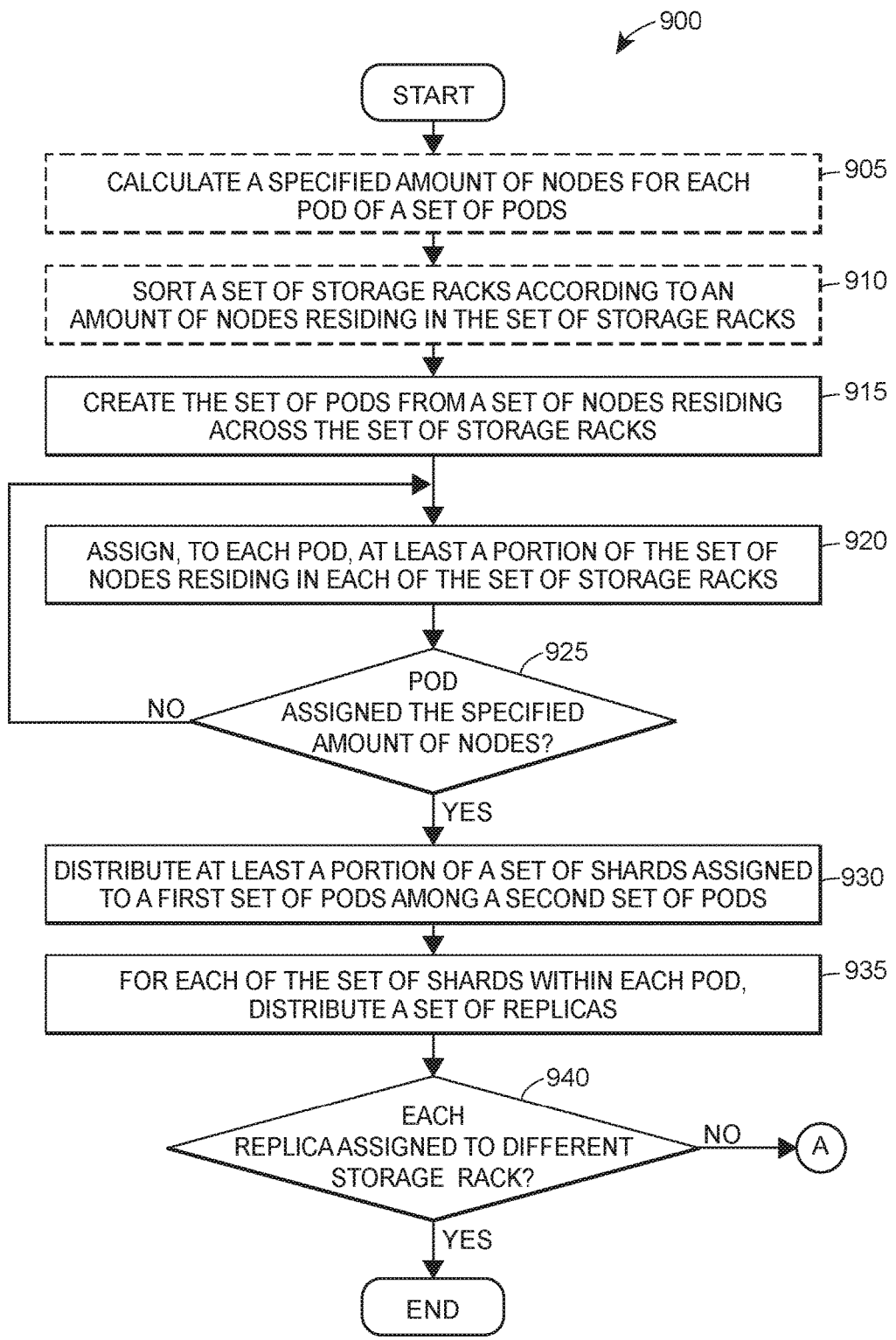
FIG. 9 depicts a flow diagram associated with balancing a set of storage resources across a distributed database, in accordance with some embodiments.

FIG. 9 illustrates a flow diagram of a method 900 of balancing data objects stored on a plurality of storage resources. The method 900 may be facilitated by an analysis server, and specifically by a combination of any of the following modules: a pod creation module, a balancer module, and a configuration module, or any combination of hardware and/or software components.

The method 900 begins with the analysis server optionally calculating (block 905) a specified amount of nodes for each pod of a set of pods. In embodiments, the analysis server may calculate the specified amount of nodes for each pod based on one or more of: an incoming network bandwidth, an outgoing network bandwidth, an amount of a set of replicas of each of a set of shards, an annualized failure rate, and a storage capacity of each of the set of nodes. The analysis server may optionally sort (block 910) a set storage racks according to an amount of nodes residing in the set of storage racks.

The analysis server may create (block 915) the set of pods from the set of nodes residing across the set of storage racks. To create each pod of the set of pods, the analysis server may assign (block 920), to each pod, at least a portion of the set of nodes residing in each of the set of storage racks. In embodiments, the analysis server may assign the nodes according to the sorted order of the set of storage racks. It should be appreciated that the analysis server may create additional pods using nodes from the same set of storage racks and/or additional storage racks after facilitating any or all of the remaining steps of the method 900. After assigning a node to a pod, the analysis server may determine (block 925) whether the pod is assigned the specified amount of nodes. If the analysis server determines that the pod is not assigned the specified amount of nodes ("NO"), processing may return to block 920. If the analysis server determines that the pod is assigned the specified amount of nodes ("YES"), processing may proceed to block 930.

Figure 10:
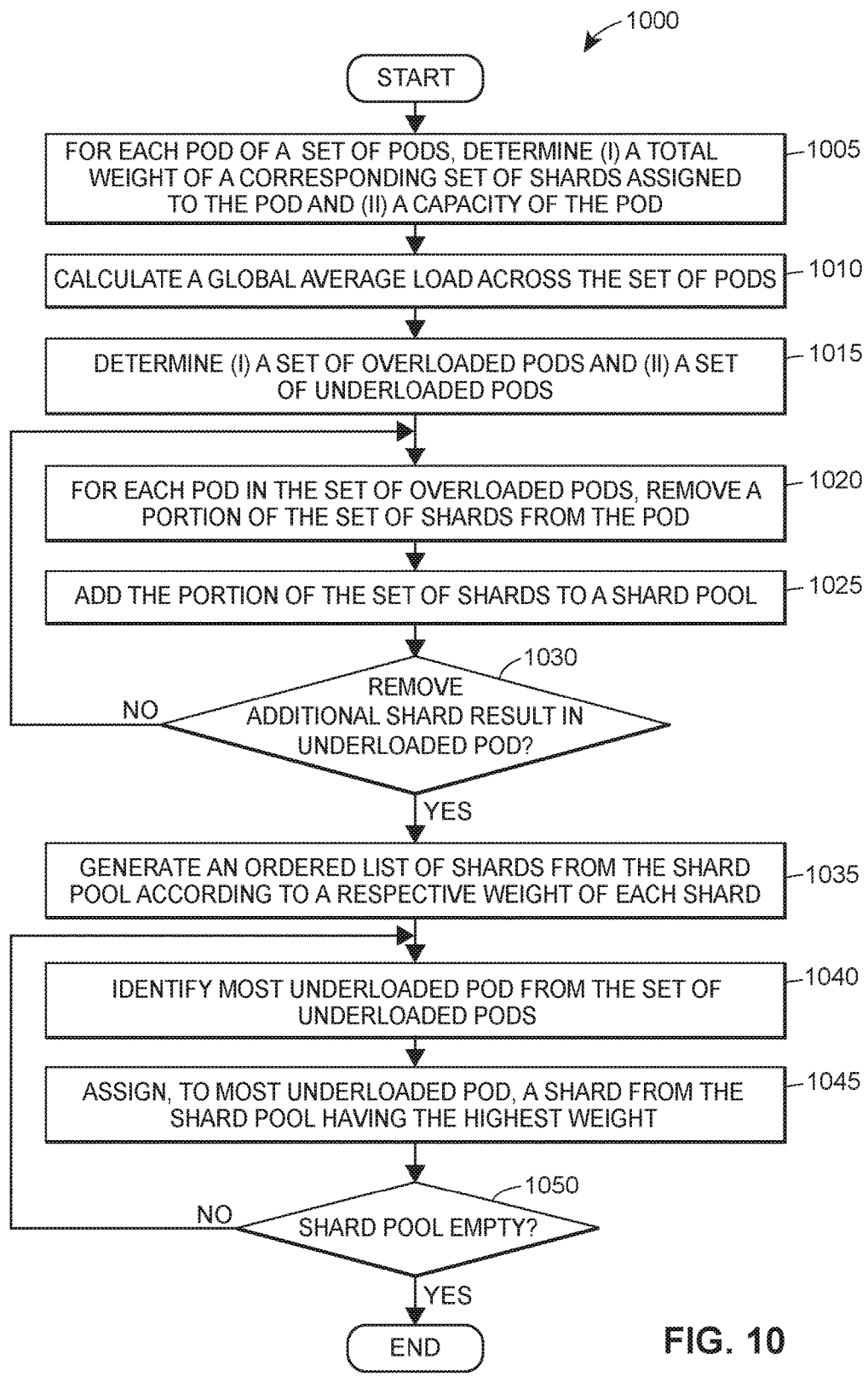
FIG. 10 depicts a flow diagram associated with balancing shards among pods, in accordance with some embodiments.

At block 930, the analysis server may distribute at least a portion of a set of shards assigned to a first set of pods among a second set of pods. FIG. 10 describes a method 1000 of facilitating the shard balancing technique in further detail. After distributing the portion of the set of shards, the analysis server may, for each of the set of shards within each pod, distribute (block 935) a set of replicas. According to embodiments, the analysis server may ensure that the amount of the set of storage racks is larger than an amount of the set of nodes that share a replica of the set of replicas.

The analysis server may determine (block 940) whether, for each of the set of pods, each replica of the set of replicas is assigned to a node of a different storage rack. If the analysis server determines that each replica is not assigned to a node of a different storage rack ("NO"), processing may proceed to "A" in which the analysis server may facilitate a method 1100 of balancing a set of replicas within a pod as discussed with respect to FIG. 11. If the analysis server determines that each replica is assigned to a node of a different storage rack ("YES"), processing may end or proceed to other functionality.

FIG. 10 illustrates a flow diagram of the method 1000 of balancing a set of shards assigned across a set of pods. According to embodiments, each shard of the set of shards may include a set of replicas of a set of data objects. The method 1000 may be facilitated by an analysis server, and specifically by a combination of any of the following modules: a pod analysis module, a shard pool creation module, a balancer module, or any other modules.

The method 1000 begins with the analysis server, for each pod of the set of pods, determining (block 1005) (i) a total weight of the corresponding set of shards assigned to the pod, and (ii) a capacity of the pod. The total weight of the corresponding set of shards assigned to the pod is the total amount of storage occupied by the set of shards in the pod, where the weight of a shard is how much resource is required to store the shard. The analysis server may also calculate (block 1010) a global average load across the set of pods, whereby the global average load may be based on a sum of the total weights of the corresponding sets of shards and a sum of the capacities of the set of pods. In embodiments, the analysis server may calculate the global average load by dividing the sum of the total weights of the corresponding sets of shards by the sum of the capacities of the set of pods.

The analysis server may determine (block 1015) (i) a set of overloaded pods and (ii) a set of underloaded pods based on the global average load, the respective total weight of the corresponding set of shards, and the respective capacity of the pod. In particular, the analysis server may, for each pod of the set of pods, calculate a headroom amount based on the global average load, the respective total weight of the corresponding set of shards, and the respective capacity of the pod. Based on the respective headroom amounts of the set of pods, the analysis server may identify the set of overloaded pods as any pods not having available headroom, and the set of underloaded pods as any pods having available headroom. In embodiments, to calculate the headroom amount for each pod, the analysis server may calculate a difference between (i) a product of the global average load and the respective capacity of the pod, and (ii) the respective total weight of the corresponding set of shards. Further, in embodiments, the analysis server may add the set of underloaded pods to a priority queue sorted by the respective headroom amount of the set of underloaded pods.

The analysis server may, for each pod in the set of overloaded pods, remove (block 1020) a portion of the set of shards from the pod. In embodiments, the analysis module may remove the portion of the set of shards from the pod in order from lightest weight to heaviest weight. The analysis server may add (block 1025) the portion of the set of shards removed from the respective pod to a shard pool. In embodiments, the analysis server may determine (block 1030) whether removing an additional shard from the pod would result in the pod being underloaded. If the analysis server determines that removing an additional shard would not result in the pod being underloaded ("NO"), processing may return to block 1020. If the analysis server determines that removing an additional shard would result in the pod being underloaded ("YES"), processing may proceed to block 1035.

At block 1035, the analysis server may generate an ordered list of shards from the shard pool according to a respective weight of each shard. In embodiments, if the analysis server determines that at least two shards from the shard pool have the same weight, then the analysis server may order the at least two shards according to respective identifications of the at least two shards.

The analysis server may identify (block 1040) the most underloaded pod from the set of underloaded pods. In embodiments, the analysis server may remove the most underloaded pod from the priority queue that is sorted by the respective headroom amount of the set of underloaded pods. The analysis server may assign (block 1045), to the most underloaded pod, a shard from the shard pool having the highest weight. After assigning the shard to the most underloaded pod (which results in the pod having a reduced headroom amount), the analysis server may determine that the pod is still underloaded (i.e., has a positive headroom amount), in which case the analysis server may insert the pod with the shard assigned thereto back into the priority queue.

The analysis server may determine (block 1050) whether the shard pool is empty. If the analysis server determines that the shard pool is not empty ("NO"), processing may return to block 1040. If the analysis server determines that the shard pool is empty ("YES"), processing may end or proceed to any other functionality.

Figure 11:
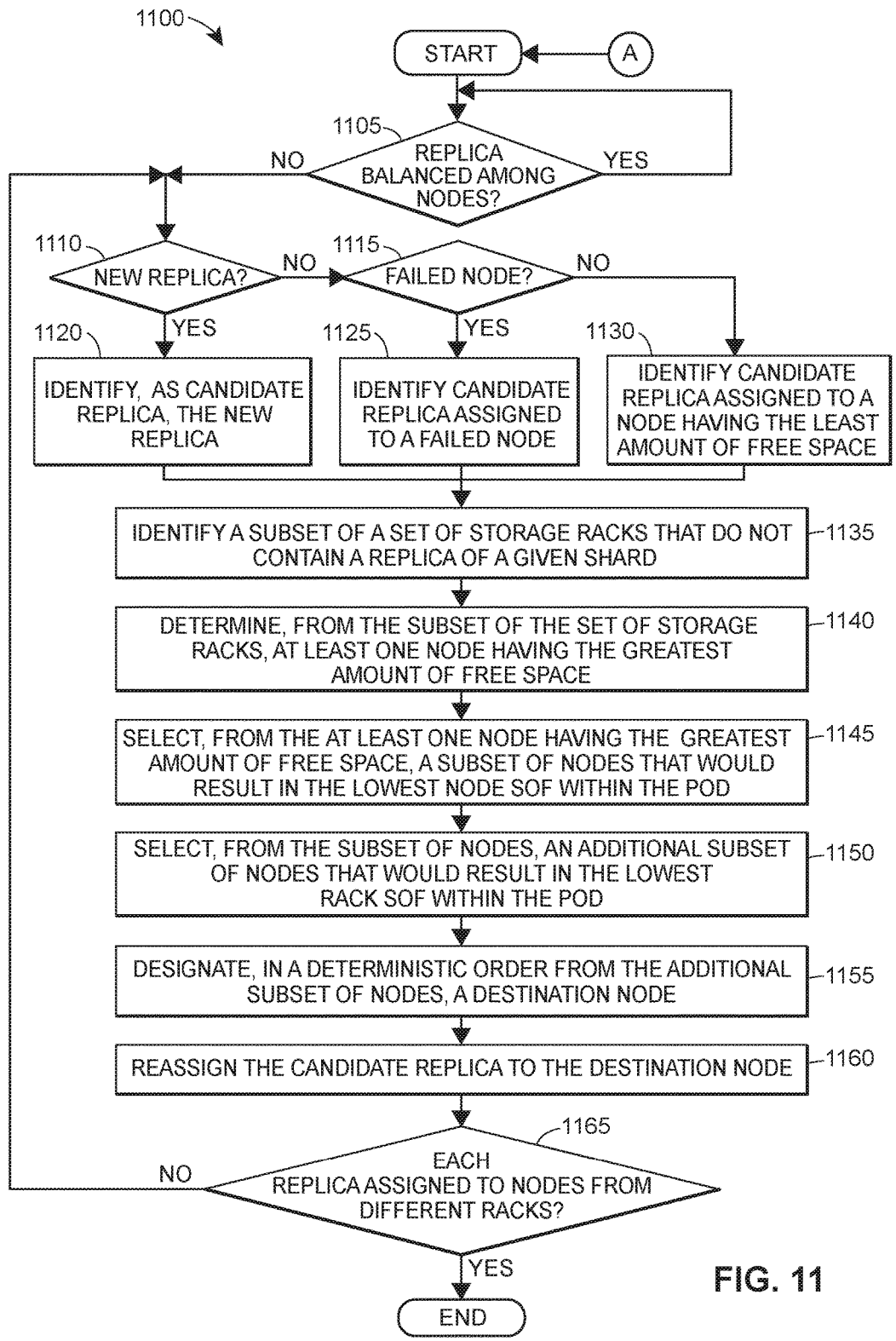
FIG. 11 depicts a flow diagram associated with balancing replicas within pods, in accordance with some embodiments.

FIG. 11 illustrates a flow diagram of a method 1100 of balancing replicas of a set of shards within a pod. The method 1100 may be facilitated by an analysis server, and specifically by a balancer module or any combination of hardware and/or software components. The analysis server may perform the method 1100 in response to determining, in block 940 of the method 900, that each replica of the set of replicas within the pod is not assigned to a node of a different storage rack. According to embodiments, the pod may have assigned a set of nodes that reside across a set of storage racks, where the set of shards may be assigned to the set of nodes.

The method 1100 begins with the analysis server determining (block 1105) whether the replicas of the set of shards are balanced among the set of nodes. If the analysis server determines that the replicas are balanced ("YES"), processing may repeat or proceed to other functionality. If the analysis server determines that the replicas are not balanced ("NO"), the analysis server may determine (block 1110) whether there is a new replica in the pod. If the analysis server determines that there is not a new replica in the pod ("NO"), processing may proceed to block 1115. If the analysis server determines that there is a new replica in the pod ("YES"), the analysis server may identify (block 1120), as a candidate replica of a given shard of the set of shards, the new replica. Processing may then proceed to block 1135.

At block 1115, the analysis server may determine whether there is a failed node. If the analysis server determines that there is not a failed node ("NO"), processing may proceed to block 1130. If the analysis server determines that there is a failed node ("YES"), the analysis server may identify (block 1125) a candidate replica of a given shard that is assigned to the failed node. Processing may then proceed to block 1135. At block 1130, the analysis server may identify a candidate replica of a given shard that is assigned to a node of the set of nodes having the least amount of free space (i.e., the most loaded node). After identifying the candidate replica in any scenario, the analysis server may identify (block 1135) a subset of the set of storage racks that do not contain a replica of the given shard.

The analysis server may then facilitate functionality to determine or identify the destination node to which to reassign the candidate replica. In particular, the analysis server may determine (block 1140), from the subset of the set of storage racks, at least one node having the greatest amount of free space. Further, the analysis server may select (block 1145), from the at least one node having the greatest amount of free space, a subset of nodes that would result in the lowest node SOF within the pod. Additionally, the analysis server may select (block 1150), from the subset of nodes, an additional subset of nodes that would result in the lowest rack SOF within the pod.

After the analysis server selects the additional subset of nodes, the analysis server may designate (block 1155), in a deterministic order from the additional subset of nodes, a destination node. According to embodiments, the analysis server may account for the determinations and selections of blocks 1140, 1145, and 1150 in any way when selecting the destination node in block 1155. After designating the destination node in block 1155, the analysis server may reassign (block 1160) the candidate replica to the destination node.

After reassigning the candidate replica to the destination node, the analysis server may determine (block 1165) whether each replica within the pod is assigned to nodes from different storage racks (i.e., whether the replicas are properly balanced). If the analysis server determines that each replica within the pod is not assigned to nodes from different storage racks ("NO"), processing may return to block 1110. If the analysis server determines that each replica within the pod is assigned to nodes from different storage racks ("YES"), then the replicas of the pod are balanced and processing may end or proceed to other functionality.

Figure 12:
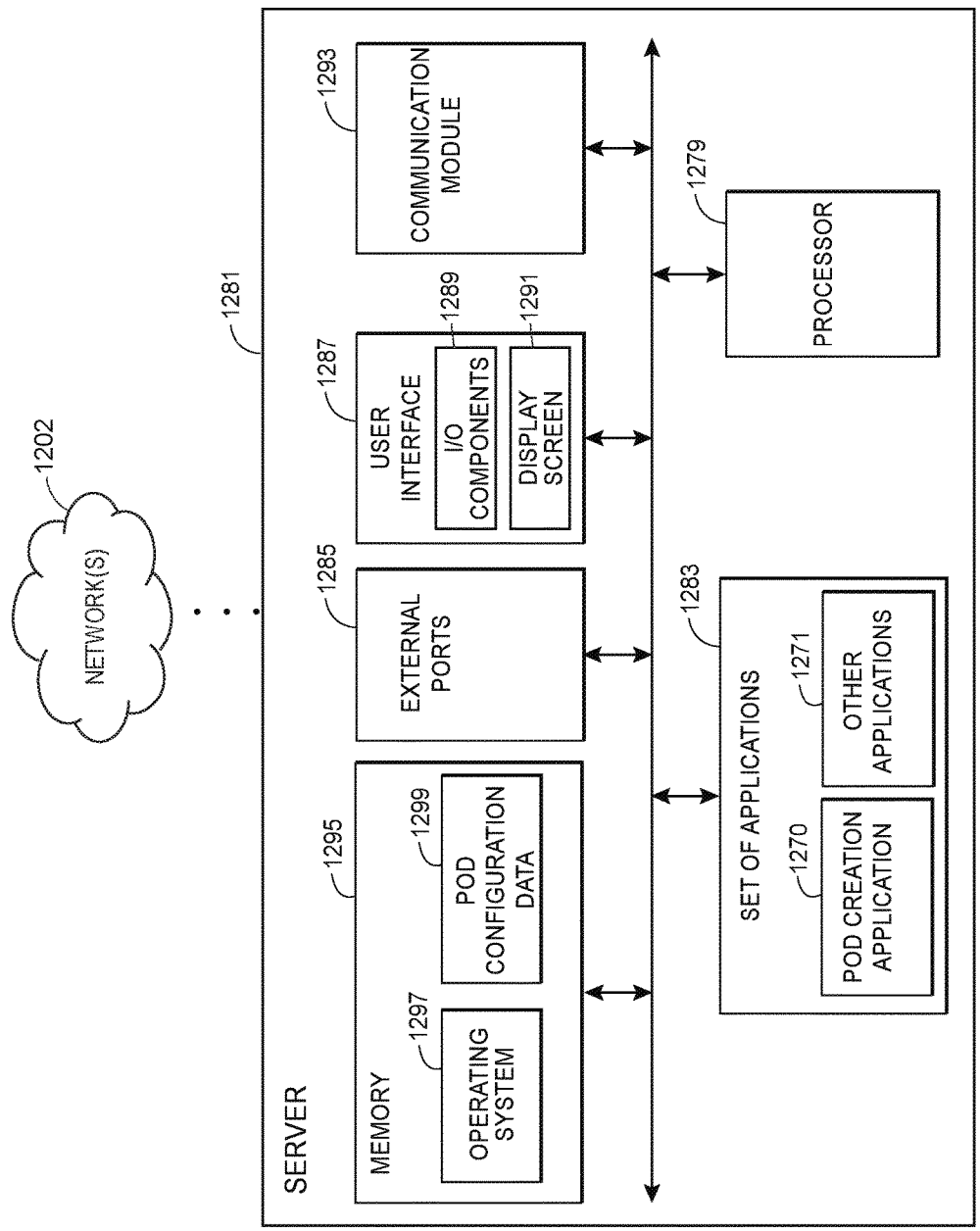
FIG. 12 depicts a hardware diagram of an analysis server and components thereof, in accordance with some embodiments.

FIG. 12 illustrates an example server 1281 in which the functionalities as discussed herein may be implemented. In some embodiments, the server 1281 may be the analysis server 201 as discussed with respect to FIG. 2. Generally, the server 1281 is a dedicated computer machine, workstation, or the like, including any combination of hardware and software components.

The server 1281 may include a processor 1279 or other similar type of controller module or microcontroller, as well as a memory 1295. The memory 1295 may store an operating system 1297 capable of facilitating the functionalities as discussed herein. The processor 1279 may interface with the memory 1295 to execute the operating system 1297 and a set of applications 1283. The set of applications 1283 (which the memory 1295 can also store) may include a pod creation application 1270 configured to create a set of pods from a set of nodes residing on a set of storage racks. The pod creation application 1270 may use certain pod configuration data 1299 stored in the memory 1295. It should be appreciated that the set of applications 1283 may include one or more other applications 1271 or modules such as, for example, a balancer application, a configuration application, a pod repair application, a pod analysis application, and a shard pool creation application.

Generally, the memory 1295 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 1281 may further include a communication module 1293 configured to interface with one or more external ports 1285 to communicate data via one or more networks 1202. For example, the communication module 1293 may leverage the external ports 1285 to establish a wide area network (WAN) or a local area network (LAN) for connecting the server 1281 to other components such as resources of a distributed database. According to some embodiments, the communication module 1293 may include one or more transceivers functioning in accordance with IEEE standards, 3GPP standards, or other standards, and configured to receive and transmit data via the one or more external ports 1285. More particularly, the communication module 1293 may include one or more wireless or wired WAN and/or LAN transceivers configured to connect the server 1281 to WANs and/or LANs.

The server 1281 may further include a user interface 1287 configured to present information to the user and/or receive inputs from the user. As illustrated in FIG. 12, the user interface 1287 may include a display screen 1291 and I/O components 1289 (e.g., capacitive or resistive touch sensitive input panels, keys, buttons, lights, LEDs, cursor control devices, haptic devices, and others).

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 1279 (e.g., working in connection with the operating system 1297) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A computer-implemented method of balancing data objects stored on a plurality of storage resources, the method comprising:

creating, by a computer processor, a set of pods, wherein each pod in the set of pods includes a plurality of nodes, at least two of which reside on different storage racks, wherein creating each pod in the set of pods comprises:

assigning, to the pod, nodes from a set of nodes residing on a set of storage racks until the pod is assigned a specified amount of nodes, wherein the pod has assigned to it, a set of shards each shard in the set of shards comprising a set of replicas of a data object, wherein all replicas of a data object are stored on a single pod of the set of pods;

after creating the set of pods, distributing at least a portion of the set of shards assigned to a first subset of pods in the set of pods among a second subset of pods in the set of pods according to an available processing capacity of the first subset and the second subset of pods in the set of pods; and after distributing at least the portion of the set of shards among the second subset of pods, distributing within a pod the set of replicas of the data object for a shard to ensure that each replica of the set of replicas for the shard is assigned to a node residing on a different storage rack of storage racks associated with the pod.

2. The computer-implemented method of claim 1, further comprising:

calculating the specified amount of nodes for each pod of the set of pods based on: an incoming network bandwidth, an outgoing network bandwidth, an amount of the set of replicas of each of the set of shards, an annualized failure rate, and a storage capacity of each of the set of nodes.

3. The computer-implemented method of claim 1, wherein assigning, to the pod, nodes from the set of nodes residing on the set of storage racks comprises:

establishing that the pod is assigned nodes to maximize representation of the set of storage racks.

4. The computer-implemented method of claim 3, wherein assigning, to the pod, nodes from the set of nodes residing on the set of storage racks comprises:

ensuring that an amount of the set of storage racks is less than or equal to the specified amount of nodes for each pod of the set of pods.

5. The computer-implemented method of claim 3, wherein assigning, to the pod, nodes from the set of nodes residing on the set of storage racks comprises:

ensuring that an amount of the set of storage racks is greater than an amount of the set of replicas for each of the set of shards.

6. The computer-implemented method of claim 4, wherein distributing the set of replicas of the data object comprises:

ensuring that the amount of the set of storage racks is larger than an amount of the set of nodes that share a replica of the set of replicas.

7. The computer-implemented method of claim 1, further comprising:

creating, by the processor, an additional set of pods from the set of nodes residing across on the set of storage racks.

8. The computer-implemented method of claim 1, further comprising:

sorting the set of storage racks according to an amount of nodes residing on the set of storage racks;

and wherein creating each pod of the set of pods comprises:

assigning, to the pod, nodes from the set of nodes residing on the set of storage racks that were sorted.

9. The computer-implemented method of claim 1, further comprising:

determining that a first pod of the set of pods needs repair;

identifying a first node of the set of nodes that ensures that a node from each of the set of storage racks is assigned to the first pod; and assigning the first node to the first pod.

10. The computer-implemented method of claim 9, wherein determining that the first pod of the set of pods needs repair comprises:

determining that at least two pods need repair, the at least two pods including the first pod; and selecting to repair the first pod based on the first pod having a least specified amount of nodes assigned thereto.

11. A system for balancing data objects stored on a plurality of storage resources, comprising:

a computer processor;

a set of storage racks;

a set of nodes residing on the set of storage racks;

a pod creation module executed by the computer processor and configured to:

create a set of pods, wherein each pod in the set of pods includes a plurality of nodes, at least two of which reside on different storage racks, wherein to create each pod in the set of pods, the pod creation module is configured to:

assign, to the pod, nodes from the set of nodes residing on the set of storage racks until the pod is assigned a specified amount of nodes, wherein the pod has assigned to it, a set of shards, each shard in the set of shards comprising a set of replicas of a data object, wherein all replicas of a data object are stored on a single pod of the set of pods; and a balancer module executed by the computer processor and configured to:

distribute at least a portion of the set of shards assigned to a first subset of pods in the set of pods among a second subset of pods in the set of pods according to an available processing capacity of each of the first subset and the second subset of pods in the set of pods, and after distributing the at least the portion of the set of shards among the second subset of pods, distribute within a pod the set of replicas of the data object for a shard to ensure that each replica of the set of replicas for the shard is assigned to a node residing on a different storage rack of storage racks associated with the pod.

12. The system of claim 11, further comprising:

a configuration module executed by the computer processor and configured to:

calculate the specified amount of nodes for each pod of the set of pods based on: an incoming network bandwidth, an outgoing network bandwidth, an amount of the set of replicas of each of the set of shards, an annualized failure rate, and a storage capacity of each of the set of nodes.

13. The system of claim 11, wherein to assign, to the pod, nodes from the set of nodes residing on the set of storage racks, the balancer module is configured to:

establish that the pod is assigned nodes to maximize representation of the set of storage racks.

14. The system of claim 13, wherein to assign, to the pod, nodes from the set of nodes residing on the set of storage racks, the balancer module is further configured to:

ensure that an amount of the set of storage racks is less than or equal to the specified amount of nodes for each pod of the set of pods.

15. The system of claim 13, wherein to assign, to the pod, nodes from the set of nodes residing on the set of storage racks, the balancer module is further configured to:

ensure that an amount of the set of storage racks is greater than an amount of the set of replicas for each of the set of shards.

16. The system of claim 14, wherein to distribute the set of replicas of the data object, the balancer module is configured to:

ensure that the amount of the set of storage racks is larger than an amount of the set of nodes that share a replica of the set of replicas.

17. The system of claim 11, wherein the pod creation module is further configured to:

create an additional set of pods from the set of nodes residing on the set of storage racks.

18. The system of claim 11, wherein the pod creation module is further configured to:

sort the set of storage racks according to an amount of nodes residing on the set of storage racks, and wherein to create each pod of the set of pods, the pod creation module is configured to:

assign, to the pod, the nodes from the set of nodes residing on the set of storage racks that were sorted.

19. The system of claim 11, further comprising:

a pod repair module executed by the computer processor and configured to:

determine that a first pod of the set of pods needs repair, identify a first node of the set of nodes that ensures that a node from each of the set of storage racks is assigned to the first pod, and assign the first node to the first pod.

20. The system of claim 19, wherein to determine that the first pod of the set of pods needs repair, the pod repair module is configured to:

determine that at least two pods need repair, the at least two pods including the first pod, and select to repair the first pod based on the first pod having a least specified amount of nodes assigned thereto.

21. A computer-implemented method of balancing, within a pod, replicas of a set of shards, the pod having assigned a set of nodes residing on a set of storage racks, the set of shards assigned to the set of nodes, the method comprising:

determining, by a computer processor, that the replicas of the set of shards are not balanced among the set of nodes;

responsive to the determining, identifying a candidate replica of a given shard of the set of shards;

identifying a subset of the set of storage racks that do not contain a replica of the given shard;

determining, from the subset of the set of storage racks, at least one node having the greatest amount of free space;

selecting, from the at least one node having the greatest amount of free space, a subset of nodes that would result in a lowest value for a maximum node shard overlap factor (SOF) between any pair of nodes within the pod;

selecting, from the subset of nodes, an additional subset of nodes that would result in a lowest value for a maximum rack SOF between any pair of storage racks associated with the pod;

designating, in a deterministic order from the additional subset of nodes, a destination node; and reassigning the candidate replica to the destination node.

22. A computer-implemented method of balancing a set of shards assigned across a set of pods, wherein each shard of the set of shards comprises a set of replicas of a set of data objects, the method comprising:
- for each pod of the set of pods, determining (i) a total weight of the corresponding set of shards assigned to the pod, and (ii) a capacity of the pod;
- calculating, by a computer processor, a global average load across the set of pods based on a sum of the total weights of the corresponding sets of shards and a sum of the capacities of the set of pods;
- determining, based on the global average load, the respective total weight of the corresponding set of shards, and the respective capacity of the pod, (i) a set of overloaded pods of the set of pods and (ii) a set of underloaded pods of the set of pods;
- creating a shard pool including, for each pod in the set of overloaded pods:
  - removing a portion of the set of shards from the pod until removing an additional shard of the set of shards would result in the pod being underloaded, and
  - adding the portion of the set of shards to the shard pool;
- generating an ordered list of shards from the shard pool according to a respective weight of each shard of the shard pool; and
- until the shard pool is empty:
  - identifying the most underloaded pod from the set of underloaded pods, and
  - assigning, to the most underloaded pod, a shard from the shard pool having the highest weight according to the ordered list of shards.

* * * * *

UNITED STATES PATENT AND TRADEMARK OFFICE
CERTIFICATE OF CORRECTION

PATENT NO. : 10,291,707 B1
APPLICATION NO. : 15/158326
DATED : May 14, 2019
INVENTOR(S) : Yi Lin et al.

It is certified that error appears in the above-identified patent and that said Letters Patent is hereby corrected as shown below:

In the Claims

Claim 7, Column 28, Line 55:
the set of nodes residing across on the set of storage
Should read:
the set of nodes residing on the set of storage Signed and Sealed this
Ninth Day of July, 2019

Andrei Iancu
*Director of the United States Patent and Trademark Office*